(12) United States Patent
Williams

(10) Patent No.: US 8,035,364 B2
(45) Date of Patent: Oct. 11, 2011

(54) STEP-DOWN SWITCHING REGULATOR WITH FREEWHEELING DIODE

(75) Inventor: Richard K. Williams, Cupertino, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 303 days.

(21) Appl. No.: 12/148,570

(22) Filed: Apr. 21, 2008

(65) Prior Publication Data

US 2008/0291711 A1   Nov. 27, 2008

Related U.S. Application Data

(60) Provisional application No. 60/926,097, filed on Apr. 25, 2007.

(51) Int. Cl.
*G05F 1/00* (2006.01)
(52) U.S. Cl. .......... 323/282; 323/225; 323/268
(58) Field of Classification Search .......... 323/222, 323/223, 225, 230, 268, 282; 363/127
See application file for complete search history.

(56) References Cited

U.S. PATENT DOCUMENTS

| | | | |
|---|---|---|---|
| 5,262,930 A | 11/1993 | Hua et al. | 363/21.03 |
| 6,051,963 A * | 4/2000 | Eagar | 323/282 |
| 6,271,651 B1 | 8/2001 | Stratakos et al. | 323/282 |
| 6,349,044 B1 | 2/2002 | Canales-Abarca et al. | 363/17 |
| 2007/0229047 A1 | 10/2007 | Sigamani et al. | 323/282 |

\* cited by examiner

*Primary Examiner* — Harry Behm
*Assistant Examiner* — Matthew Grubb
(74) *Attorney, Agent, or Firm* — Patentability Associates

(57) ABSTRACT

A freewheeling DC/DC step-down converter includes a high-side MOSFET, an inductor and an output capacitor connected between the input voltage and ground. A freewheeling clamp, which includes a freewheeling MOSFET and diode, is connected across the inductor. When the high-side MOSFET is turned off, a current circulates through the inductor and freewheeling clamp rather than to ground, improving the efficiency of the converter. The converter has softer diode recovery and less voltage overshoot and noise than conventional Buck converters and features unique benefits during light-load conditions.

6 Claims, 27 Drawing Sheets

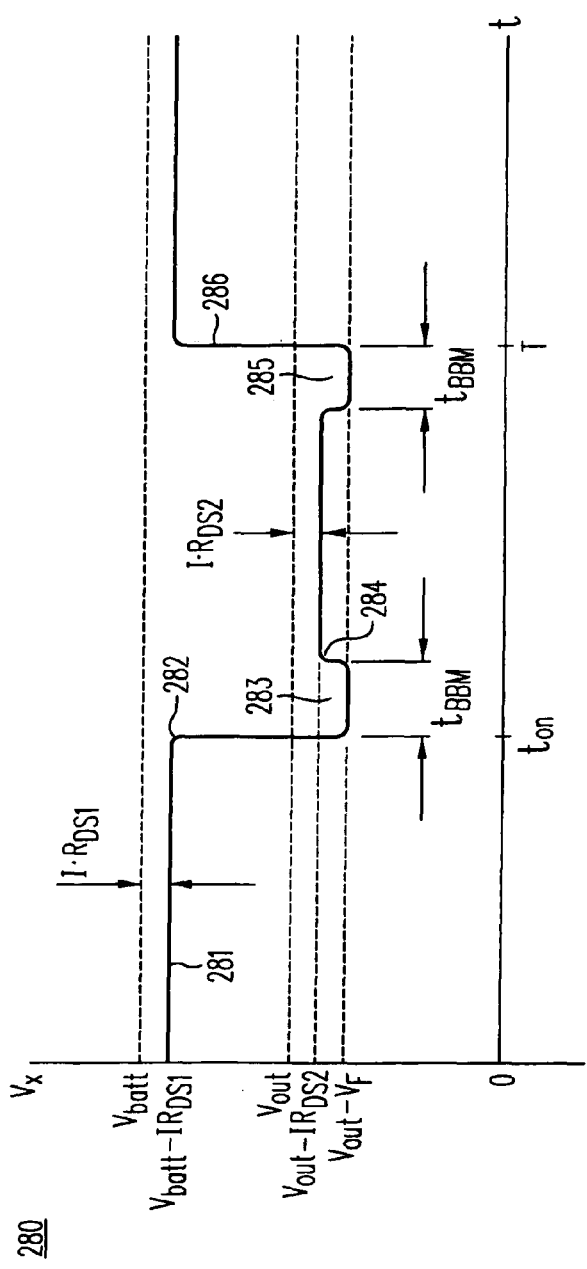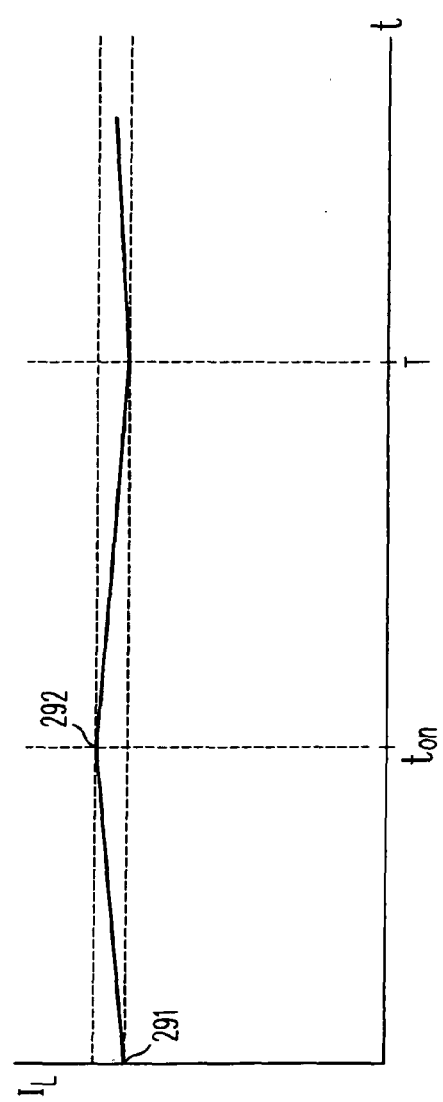

STEP-DOWN SWITCHING REGULATOR WITH FREEWHEELING DIODE

CROSS-REFERENCE TO RELATED APPLICATIONS

This application claims the priority of Provisional Application No. 60/926,097, filed Apr. 25, 2007, which is incorporated herein by reference in its entirety.

This application is related to application Ser. No. 12/148,576, titled "Boost And Up-Down Switching Regulator With Synchronous Freewheeling MOSFET," filed contemporaneously herewith, which is incorporated herein by reference in its entirety.

BACKGROUND OF THE INVENTION

Voltage regulation is commonly required to prevent variation in the supply voltage powering various microelectronic components, such as digital ICs, semiconductor memories, display modules, hard disk drives, RF circuitry, microprocessors, digital signal processors and analog ICs, especially in battery-powered applications such as cell phones, notebook computers and consumer products.

Since the battery or DC input voltage of a product often must be stepped-up to a higher DC voltage, or stepped-down to a lower DC voltage, such regulators are referred to as DC-to-DC converters. Step-down converters, commonly referred to as Buck converters, are used whenever a battery's voltage is greater than the desired load voltage. Step-down converters may comprise inductive switching regulators, capacitive charge pumps, and linear regulators. Conversely, step-up converters, commonly referred to boost converters, are needed whenever a battery's voltage is lower than the voltage needed to power its load. Step-up converters may comprise inductive switching regulators or capacitive charge pumps.

Of the aforementioned voltage regulators, the inductive switching converter can achieve superior performance over the widest range of currents, input voltages and output voltages. The operation of a DC/DC inductive switching converter is based on the simple principle that the current in an inductor (coil or transformer) cannot be changed instantly, and that an inductor will produce an opposing voltage to resist any change in its current.

The basic principle of an inductor-based DC/DC switching converter is to switch or "chop" a DC supply voltage into pulses or bursts, and to filter those bursts using a low-pass filter comprising an inductor and a capacitor to produce a well-behaved time-varying voltage, i.e. to change a DC voltage into an AC voltage. By using one or more transistors switching at a high frequency to repeatedly magnetize and de-magnetize an inductor, the inductor can be used to step-up or step-down the converter's input voltage, producing an output voltage different from its input voltage. After changing the AC voltage up or down using magnetics, the output voltage is then rectified back into a DC voltage, and filtered to remove any ripples.

The DC/DC converter is typically implemented using MOSFETs with a low on-state resistance, commonly referred to as "power MOSFETs". Using feedback from the converter's output voltage to control the switching conditions, a constant well-regulated output voltage can be maintained despite rapid changes in the converter's input voltage or its output current.

To remove any AC noise or ripple generated by the switching action of the MOSFETs, an output capacitor is placed across the output terminal of the switching regulator circuit. Together the inductor and the output capacitor form a "low-pass" filter able to prevent most of the MOSFETs' switching noise before it reaches the load. The switching frequency, typically 1 MHz or more, must be "high" relative to the resonant frequency of the filter's "LC" tank. Averaged across multiple switching cycles, the switched inductor behaves like a programmable current source with a slow-changing average current.

Since the average inductor current is controlled by MOSFETs that are either biased as "on" or "off" switches, the power dissipation in the MOSFETs is theoretically small, and high converter efficiencies, in the 80% to 90% range, can be realized. Specifically when a power MOSFET is biased as an on-state switch using a "high" gate bias, it exhibits a linear I-V drain characteristic with a low $R_{DS(on)}$ resistance typically 200 milliohms or less. At 0.5 A for example, such a device will exhibit a maximum voltage drop $I_D \cdot R_{DS(on)}$ of only 100 mV despite its high drain current. Its power dissipation during its on-state conduction time is $I_D^2 \cdot R_{DS}(on)$. In the example given, the power dissipated while the transistor is conducting is $(0.5\,A)^2 \cdot (0.2\Omega) = 50$ mW.

Thus a power MOSFET has its gate biased to its source, i.e. so that $V_{GS}=0$. Even with an applied drain voltage $V_{DS}$ equal to a converter's battery input voltage $V_{batt}$, a power MOSFET's drain current $I_{DSS}$ is very small, generally well below one microampere and more generally in the range of nanoamperes. The current $I_{DSS}$ primarily comprises junction leakage.

For these reasons, a power MOSFET used as a switch in a DC/DC converter is efficient, since in its off-condition it exhibits low currents at high voltages, and in its on-state it exhibits high currents at a low voltage drop. Excepting switching transients, the $I_D \cdot V_{DS}$ product in the power MOSFET remains small, and power dissipation in the switch remains low.

A critical component in switching regulation is the rectifier function needed to convert, or "rectify", the synthesized AC output of the chopper back into a DC voltage. To ensure that the load never sees a reversal of polarity in voltage, a rectifier diode is placed in the series path of the switched inductor and the load, thereby blocking large AC signals from the load. The rectifier may be located topologically either in the high-side path, i.e., between the positive terminal of the power or battery input and the positive terminal of the output, or on the low-side path, i.e. in the "ground" return path. Another function of the rectifier is to control the direction of energy flow so that current only flows from the converter to the load and does not reverse direction.

In one class of switching regulators, the rectifier function employs a P-N junction diode or a Schottky diode. The Schottky diode is preferred over the P-N junction because it exhibits a lower forward voltage drop than P-N junctions, typically 400 mV instead of 700 mV, and therefore dissipates less power. During forward conduction, a P-N diode stores charge in the form of minority carriers. These minority carriers must be removed, i.e. extracted, or recombine naturally before the diode is able to block current in its reverse-biased polarity.

Because a Schottky diode contains a metal-semiconductor interface rather than a P-N junction, ideally it does not utilize minority carriers to conduct and therefore stores less charge than a P-N junction diode. With less stored charge, the Schottky diode is able to respond more quickly to changes in the polarity of the voltage across its terminals and to operate at higher frequencies. Unfortunately Schottky diodes have several major disadvantages, one of which is that it exhibits significant and unwanted off-state leakage current, especially at high temperatures. As a result, there is unfortunately a fundamental tradeoff between a Schottky diode's relatively high off-state leakage current and its relatively low forward-biased voltage drop.

Moreover, the lower its voltage drop during conduction, the leakier it becomes in its off state. The leakage current also exhibits a positive voltage coefficient of current, so that as the leakage current increases, power dissipation also increases, causing the Schottky diode to leak more and dissipate more power, causing even more heating. With such positive feedback, localized heating can cause a hot spot to get hotter and "hog" more of the leakage until the spot reaches such a high current density that the device fails, a process known as thermal runaway.

Another disadvantage of a Schottky diode is the difficulty of integrating it into an IC using conventional wafer fabrication processes and manufacturing. Metals with the best properties for Schottky diodes are not commonly available in IC processes. Some commonly available metals exhibit too high a voltage barrier, i.e. too high a voltage drop, while other commonly available metals exhibit too low a barrier potential, i.e. they allow too much leakage current.

Despite these limitations, many switching regulators today use P-N diodes or Schottky diodes for rectification. As a two-terminal device, a rectifier does not require a gate signal to control when it conducts. Aside from current resulting from the transient charge storage, the rectifier naturally prevents reverse currents, so that energy cannot flow from the output capacitor and electrical load back into the converter and its inductor.

To reduce voltage drops and conduction losses, power MOSFETs are sometimes used in place of Schottky rectifier diodes in switching regulators. Operation of a MOSFET as a rectifier is often accomplished by placing the MOSFET in parallel with a Schottky diode and turning on the MOSFET whenever the diode conducts, i.e. synchronous to the diode's conduction. In such an application, the MOSFET is sometimes referred to as a "synchronous rectifier."

Since a synchronous rectifier MOSFET can be sized to have a low on-resistance and a lower voltage drop than a Schottky diode, when the Schottky diode is conducting current is diverted from the diode to the MOSFET channel, and the overall power dissipation in the "rectifier" is reduced. Most power MOSFETs includes a parasitic source-to-drain diode. In a switching regulator, the orientation of this intrinsic P-N diode must be the same polarity as the Schottky diode, i.e. cathode to cathode, anode to anode. Since the parallel combination of the silicon P-N diode and Schottky diode carries current only for brief intervals, known as "break-before-make" intervals, before the synchronous rectifier MOSFET turns on, the average power dissipation in the diodes is low, and the Schottky diode is often eliminated altogether.

Assuming that the transistor switching events are relatively fast compared to the oscillating period of the regulator, the power losses during switching can be considered negligible or alternatively treated as a fixed power loss. Overall, the power lost in a low-voltage switching regulator can be estimated by considering the conduction and gate drive losses. At multi-megahertz switching frequencies, however, the switching waveform analysis becomes more significant and the MOSFET's drain voltage, drain current, and gate voltage must be analyzed as a function of time.

A synchronous rectifier MOSFET, however, unlike a Schottky or P-N junction diode, allows current to flow bi-directionally and must be operated with precise timing on its gate signal to prevent a reverse current flow, an unwanted type of conduction that lowers efficiency, increases power dissipation and heating, and may damage the device. By slowing down the switching rates and increasing the turn-on delays, efficiency can often be traded for improved robustness in DC/DC switching regulators.

Applying the above principles, present inductor-based DC/DC switching regulators are implemented in a wide range of circuits, inductors, and converter topologies. Broadly, they can be divided into two major topologies, non-isolated and isolated converters.

The most common isolated converters include the flyback converter and the forward converter, and require a transformer or coupled inductor. At higher power, full-bridge converters are also used. Isolated converters are able to step up or step down the input voltages depending on the primary to secondary winding ratio of the transformer. Transformers with multiple windings can produce multiple outputs simultaneously, including voltages both higher and lower than the input. The disadvantage of transformers is they are large compared to single-winding inductors and suffer from unwanted stray inductances.

Non-isolated converters include step-down. Buck converters, step-up boost converters, and Buck-boost converters. Buck and boost converters are efficient and compact in size, particularly when operating in the megahertz frequency range, where inductors of 2.2 μH or less may be used. Such topologies produce a single regulated output voltage per coil, and require a dedicated control loop and a separate PWM controller for each output to constantly adjust the on-times of the MOSFET switches so as to regulate the output voltage.

In portable and battery powered applications, synchronous rectification is commonly employed to improve efficiency. A step-up boost converter employing synchronous rectification is known as a synchronous boost converter. A step-down Buck converter employing synchronous rectification is known as a synchronous Buck regulator.

Non-Synchronous Versus Synchronous Buck Converter Operation

As illustrated in FIG. 1A, a prior art Buck converter 1 includes a P-channel or N-channel power MOSFET 2, an inductor 3, an output capacitor 4, a Schottky rectifier diode 5, and a pulse-width modulation (PWM) controller 6. Inductor 3, MOSFET 2 and rectifier 5 share a common node referred to here as the "$V_x$" node (sometimes referred to as the "$L_x$" node), which exhibits a voltage $V_x$. A diode 7 is parasitic to MOSFET 2 and remains reverse-biased and off throughout regular operation of Buck converter 1.

Through the switching action of power MOSFET 2, the $V_x$ node switches "rail-to-rail," exhibiting a potential alternating between approximately $V_{batt}$ when MOSFET 2 is on (and conducting a current $I_{L(on)}$) to slightly below ground when MOSFET 2 is off (when a current $I_{L(off)}$ recirculates through rectifier diode 5). The waveform of $V_x$ is illustrated in graph 10 of FIG. 1B, where $V_x$ when MOSFET 2 is conducting (curve 11) is given by the expression ($V_{batt}-I \cdot R_{DS(on)}$) and $V_x$ when MOSFET 2 is off (curve 14) is given by $-V_f$.

At time t=12, after a duration $t_{on}$, inductor 3 drives voltage $V_x$ negative, and depending on the design and layout of converter 1 at this point $V_x$ may experience some voltage overshoot and unwanted oscillations or ringing 13. After an interval $t_{off}$ at time 15, MOSFET 2 turns on, and after diode 5 recovers from any stored charge, $V_x$ exhibits a positive transition 15 and the entire cycle repeats.

In a synchronous Buck converter, rectifier diode 5 is replaced by a second power MOSFET. As shown in FIG. 2A, a synchronous Buck converter 20 includes a high-side power MOSFET switch 22, an inductor 23, an output capacitor 24, and a low-side synchronous rectifier MOSFET 21 with an intrinsic parallel diode 25. The gates of MOSFETs 22 and 21 are driven by break-before-make (BBM) circuitry 27 and controlled by a PWM controller 26 in response to a feedback voltage $V_{FB}$ from the converter's output present across output capacitor 24. BBM operation is needed to prevent a short between $V_{batt}$ and ground through MOSFETs 21 and 22.

The waveform for $V_x$ in synchronous regulator 20 is illustrated in graph 30 of FIG. 2B, where through the switching action of high-side power MOSFET 22, the $V_x$ node switches rail-to-rail, exhibiting a potential alternating between approximately $V_{batt}$ when said MOSFET is on (and conducting current $I_{L(on)}$) and to slightly below ground when MOSFET 22 is off (when a current $I_{L(off)}$ recirculates through MOSFET 21). $V_x$ is illustrated in graph 30 as being equal to $V_{batt}-I \cdot R_{DS1(on)}$ when MOSFET 22 is conducting (curve 31).

At time t=32, after a duration $t_{on}$, inductor 23 drives $V_x$ negative, and depending on the design and layout of converter 20 may experience some voltage overshoot and unwanted oscillations or ringing 33 before settling to a voltage $-V_f$. At time t=34 after a break-before-make time interval $t_{BBM}$ (as determined by BBM circuitry 27), $V_x$ is reduced by conducting synchronous rectifier MOSFET 21 to a magnitude $(-I \cdot R_{DS2(on)})$, reducing the power loss compared to dissipation in P-N diode 25.

At a time t=35, just before high-side MOSFET 22 is turned on, synchronous rectifier MOSFET 21 is shut off and $V_x$ returns to $-V_f$, (curve 36), the forward voltage drop across diode 25. After an interval $t_{off}$, MOSFET 22 turns on, and after P-N diode 25 recovers from any charge storage, $V_x$ exhibits a positive transition 37. Depending on the recovery of P-N diode 25 $V_x$ may exhibit an over-voltage spike 38. Following spike 38 and subsequent ringing $V_x$ stabilizes at $(V_{batt}-I \cdot R_{DS1(on)})$ and the entire cycle repeats.

High-side MOSFET 22 may be an N-channel or P-channel MOSFET. The grounded synchronous rectifier MOSFET 21 is more conveniently implemented as an N-channel MOSFET. Diode 28, which remains off and reverse-biased during the normal operation of converter 22, is a P-N diode intrinsic to high-side MOSFET 22. Since diode 28 does not conduct under normal operation, it is shown with dotted lines. Diode 25, intrinsic to synchronous rectifier MOSFET 21, becomes forward-biased whenever high-side MOSFET 22 is off but carries a substantial current only when MOSFET 21 is off. A Schottky diode may be included in parallel with MOSFET 21 but with series inductance may not operate fast enough to divert current from the forward-biased diode 25.

If the percentage of the time that energy flows from the battery or power source into the DC/DC converter (i.e. the percentage of time when high-side MOSFET switch 22 is on and inductor 23 is being magnetized) is defined as the duty factor D of the converter, the output-to-input voltage ratio of the converter is proportionate to the duty factor, i.e.

$$\frac{V_{out}}{V_{in}} = D \equiv \frac{t_{on}}{T}$$

While this equation describes a wide range of conversion ratios, a Buck converter cannot smoothly approach a voltage ratio of zero or unity without requiring extremely fast devices and circuit response times. Considering these factors, the duty factor of a Buck converter is limited in practice to the range of 5% to 95%.

Forced Diode Recovery Operation and Impact

Diode recovery is a major source of power loss and electrical noise in switching regulators. In graph 30 of FIG. 2B, the high dV/dt voltage transient 37 and voltage overshoot 38 occur because of stored charge in diode 25. This phenomenon is better explained in graph 40 of FIG. 2C, wherein the rectifier current $I_{rect}$ and the voltage $V_x$ are plotted against time. Prior to time $t_1$, as shown in inset 41, high-side MOSFET 22 is off and the low-side synchronous rectifier MOSFET 21 is on, carrying a current $I_{rect}$ that is the same as the current $I_L$ flowing through inductor 23, i.e. $I_{rect}=I_L$ (curve 50). During this interval $V_x$ (the voltage across synchronous rectifier MOSFET 21) is equal to $I_{rect} \cdot R_{DS2(on)}$ (curve 60).

At time $t_1$ MOSFET 21 turns off and P-N junction diode 25 must carry the inductor current $I_L$ by itself. As a result, $V_x$ increases in absolute magnitude to $-V_f$ (curve 61). During this break-before-make interval, charge is stored in P-N junction diode 25. This condition, illustrated in inset 42, persists until time $t_2$, when high-side MOSFET 22 once again turns on.

As shown in inset 43, the instant MOSFET 22 turns on it is biased with a large drain voltage and a small gate voltage operating in its saturated region as a controlled current source, ramping up in current. As the current in MOSFET 22 ramps up, it supplies an increasing percentage of current in inductor 23, diminishing the current burden in rectifier diode 25 as evidenced by the linear drop in $I_{rect}$ current (curve 51). During this ramp-up, the absolute value of the voltage across reverse-biased diode 25 declines gradually by an amount $\Delta V_x$ (curve 62), but diode 25 remains reverse-biased and $V_x$ is still below ground.

If no charge were present in P-N diode 25, at time $t_2$ when current $I_{rect}$ reaches zero, diode 25 would turn off and $I_{rect}$ would never go negative. But because of stored charge in P-N diode 25, the current ramp (curve 51) in diode 25 reverses polarity and actually goes negative, with current flowing into the cathode of diode 25. As the charge in the diode depletes and recombines, the voltage across diode 25 approaches zero (curve 63).

At time $t_6$ the voltage across rectifier diode 25 reverses polarity and the diode reverse recovery current reaches its peak (point 52). $V_x$ then rises rapidly with a high dV/dt slew rate (curve 64), powered by a high side MOSFET 22 which is now biased into a full-on condition with an on-state resistance $R_{DS1(on)}$ as represented schematically in inset 44. During this interval, high-side MOSFET 22 must supply both the current through inductor 23 and the reverse-recovery current in diode 25. A reverse current in diode 25 means current is flowing into the cathode of the P-N junction diode even though the diode is reverse-biased and theoretically should be off. By temporarily conducting a negative current while being reverse-biased (curve 53), diode 25 produces an energy loss $E_{rr}$ during the interval $\Delta t_{rr}=t_9-t_6$ and given by $$E_{rr} \approx \int_{t_6}^{t_9} I(t) \cdot V(t) dt$$

$E_{rr}$ can be substantial. Reverse currents of 1 A or more may occur with instantaneous power $(I_{rr(peak)} \cdot V_{batt})$ losses of over 4W. Since this reverse current is supplied through $V_{batt}$-connected high-side MOSFET 22, the energy loss is similar to shoot-through current losses, and using a triangular approximation contributes an average power loss of $(2W) \cdot \Delta t_{rr}/T$.

Moreover, because of the high dV/dt in the region of curve 63, $V_x$ over-shoots the battery input voltage $V_{batt}$. The cause for this overshoot is represented schematically in equivalent circuit 100 of FIG. 2D, where the battery is represented by voltage source 101, the inductor by current source 103, the charged output capacitor by voltage source 104, the high side MOSFET with drain current $I_1$ represented by controlled current source 102, and the recovery diode 105 by a junction capacitance 107 and a minority carrier diffusion capacitance by P-N junction diode 106.

Inset 108 traces the change in $I_1$ with the drain voltage $V_{DS1}$ of high-side MOSFET 102 over time, where $V_{DS1}=(V_{batt}-V_x)$. For example, at time $t_2$ the high-side MOSFET is off and current $I_1$ is zero. As the gate voltage of the high-side MOSFET operating in its saturated region increases (bracket 109) in magnitude from $V_G(t_3)$ to $V_G(t_7)$, the magnitude of current $I_1$ increases without significant changes in drain voltage $V_{DS1}$. For example, at time $t_6$, $V_x=0$ and the drain voltage has a voltage $V_{DS1}=V_{batt}$ (point 112). The voltage during this time period is nearly constant because diode 105 still contains stored charge and will not let $V_x$ change. Beyond time $t_7$, however, the diode "let's go" and the voltage changes rapidly (curve 111).

Referring again to FIG. 2C, at time $t_8$ the voltage overshoot may reach a peak voltage $V_{peak}$ (point 65). If the magnitude of $V_{peak}$ is 600 mV or more greater than $V_{batt}$, it will momentarily forward-bias the high-side diode 28, storing charge and causing noise and further oscillations (curve 66).

Finally, at time $t_9$, as shown in inset 67 in FIG. 2C, the $V_x$ voltage stabilizes at $V_{batt}$ (curve 67), the rectifier current $I_{rect}$ is zero (curve 54), and the reverse recovery of diode 25 is complete. Referring again to inset 108 of FIG. 2D, at point 113 the gate of high-side MOSFET 102 reaches a bias $V_G(t_8)$ and MOSFET 102 enters its linear region (curve 110), no longer behaving as a controlled current source. In the linear region 110, the drain current $I_1$ and drain voltage $V_{DS1}$ do not change substantially.

In conclusion, diode recovery occurs in a synchronous Buck converter as a consequence of break-before-make operation, where both high-side and low-side MOSFETs are momentarily off. The charge stored in the diode leads to current spikes between the battery input and ground, i.e. across the converter's power input. It also causes increased power dissipation, loss of efficiency, high dV/dt slew rates, voltage overshoot, noise, and unwanted ringing and oscillations. Such oscillations may also limit the maximum operating frequency of the switching regulator.

Gate Drive Losses

Another source of power loss in a Buck converter results from the charging and discharging of the MOSFET gate capacitances. The origin of gate drive loss is represented schematically in the Buck converter 120 of FIG. 3A, where a P-channel MOSFET 122 includes a drain-to-gate capacitance $C_{DG}$ (capacitor 126), gate-to-source capacitance $C_{GS}$ (capacitor 128), and drain-to-source capacitance $C_{DS}$ (capacitor 127). To turn MOSFET 122 on and off, gate driver 125 must supply transient gate drive currents $i_G(t)$ to charge and discharge the gate connected $C_{DG}$ and $C_{GS}$ capacitors 126 and 128 at the desired frequency. All of the MOSFET's capacitors shown are voltage variable.

The magnitude of drain-to-gate capacitor 126 is especially important since it appears larger in actual operation than its small signal equivalent value. This amplifying effect on input capacitance, originally known as the "Miller" effect in bipolar amplifiers, is a consequence of voltage gain in converter 120. This voltage gain $A_v(t)$ occurs during operating conditions when MOSFET 122 is saturated and behaves like a programmable current source. The $C_{DG}$ input capacitance is scaled in proportion to this gain, which varies during a switching transient.

Even though the parasitic capacitance in MOSFET 122 gives rise to gate drive and switching losses, the power required to drive the MOSFET's capacitance is manifested in gate driver 125, not in the MOSFET itself and must be supplied by the battery input source $V_{batt}$. Changing the high-side MOSFET from a common-source configured P-channel device to a source-follower N-channel device does not eliminate the Miller feedback effect.

In Buck converter 140 of FIG. 3B, for example, a high-side N-channel MOSFET 142 includes a drain-to-gate capacitance $C_{DG}$ (capacitor 146), a gate-to-source capacitance $C_{GS}$ (capacitor 148), and a drain-to-source capacitance $C_{DS}$ (capacitor 147). To turn MOSFET 142 on and off, a source-referenced gate driver 145 must supply transient gate drive currents $i_G(t)$ to charge and discharge the gate connected $C_{DG}$ and $C_{GS}$ (capacitors 146 and 148) at the desired frequency. All of the MOSFET's capacitors shown are voltage variable.

Even though the drain of N-channel MOSFET 142 is biased at a fixed potential $V_{batt}$, gate driver 145 must float with the voltage $V_x$, so that the gate potential $V_G$ changes with respect to the drain potential $V_D$ during a switching transient. As a consequence the magnitude of input capacitance is still amplified by the Miller effect and must be driven by gate driver 145. The power needed to drive the extra capacitance is delivered from bootstrap capacitor 149, which is ultimately is supplied from $V_{batt}$ through forward-biased bootstrap diode 150 whenever $V_x$ is at ground.

Gate drive loss therefore occurs driving the high-side MOSFET in a Buck converter regardless of whether the device is an N-channel source-follower device or a P-channel common-source configured device. Rather than calculate the power loss in a voltage variable capacitor, a more accurate measurement of gate drive requirements of a power MOSFET is the gate charge curve 160 shown in FIG. 3C. The graph illustrates a plot of the gate-to-source voltage $V_{GS}$ of the MOSFET versus the total gate charge $Q_G$ needed to drive the gate to that voltage. Taking into account changing bias conditions, the aforementioned Miller effect, and non-linear capacitances, the gate charge measurement method is more useful than capacitance calculations in determining gate drive loss.

The gate charge curve is generated using a power MOSFET with its gate driven by a constant current source $I_G$. To properly model the effect of gate to drain feedback, the MOSFET drives a load comprising a resistor or current-source powered from $V_{batt}$. The device is characterized by starting with an off MOSFET and zero gate bias (point 161) and at a start time, but switching on the current source driving the MOSFET's gate. As the gate $V_{GS}$ voltage rises to its threshold and beyond, then at $V_{GS}$(on) the transistor has adequate transconductance to carry the load current and the drain voltage begins to drop (curve 163).

During the $dV_{DS}/dt$ transition, the gate-to-drain capacitance $C_{DG}$ must be charged by equal and opposite charges coming from the drain and gate terminals. Since the constant gate current is charging $C_{GD}$ no charge is left over to charge the gate-to-source capacitor $C_{GS}$, and as a result the gate potential becomes constant (curve 164). This plateau in gate voltage represents the charge needed to satisfy charge neutrality and quantitatively measures drain-to-gate feedback, i.e. the Miller effect over the entire transient. Once the drain voltage drops to semi-constant value, the MOSFET enters its linear region where $V_{DS}=I_D \cdot R_{DS1}$ and the gate voltage $V_{GS}$ resumes its upward transition.

Since the gate current in the measurement is a constant magnitude $I_G$, the abscissa of graph 160 can be changed from time "t" to gate-charge $Q_G$ by the linear relationship $Q_G=I_G \cdot t$.

As shown in graph 160, the drain voltage $V_{DS}(t)$ and gate voltage $V_{GS}(t)$ can then be plotted against gate charge. As illustrated there is a unique and specific amount of gate charge $Q_G$ needed to drive the gate to a specific gate voltage 162 and drain voltage 165. Since charge is conserved, the shape of the graph doesn't depend on the speed by which the measurement was made. If the $I_G$ is increased, the time t is decreased by in proportion and graph 160 remains unchanged.

The effective input capacitance of the power MOSFET switching between "off" with gate voltage $V_{GS\alpha}=0$ and "fully-on" with the gate at potential $V_{GS\beta}$ is given by $$C_{eq} = \frac{\Delta Q}{\Delta V} = \frac{Q_{G\beta}}{V_{GS\beta}}$$

where $Q_{G\beta}$ is the sum of all the charges required for the MOSFET to transition from off to on, i.e. $Q_{G(on)}$, then through its saturation region $\Delta Q_{DG}$ and into its linear region by an amount $\Delta Q_D(lin)$, or as $$C_{eq} = \frac{Q_{G\beta}}{V_{GS\beta}} = \frac{Q_G(on) + \Delta Q_{DG} + \Delta Q_G(lin)}{V_{GS\beta}}$$

Since charge is conserved, the equivalent capacitance $C_{eq}$ to drive the MOSFET's gate to a voltage $V_{GS\beta}$ is path independent, meaning that the power needed to bias the device to a fully on condition is independent of the drive technique. Gate-drive power loss is however dependent on the drain bias $V_{batt}$, which determines the width of the plateau $\Delta Q_{DG}$. The higher the $V_{batt}$ voltage is, the larger the magnitude of $V_{DS}$ and the wider the gate plateau $\Delta Q_{DG}$.

In essence, $\Delta Q_{DG}$ plateau (curve 164) in graph 160 represents the small-signal Miller feedback effect on input capacitance as measured in a large scale MOSFET switching transient, and accurately accounts for the total energy lost in the transient. Even if a voltage source is used to power the gate during switching, the energy and power losses remain the same. Only by minimizing the drain voltage transition causing the $\Delta Q_{DG}$ can the losses be reduced in any given power MOSFET. Unfortunately since $V_{batt}$ is the input to a DC/DC converter, it is not available as a variable to control gate drive losses.

Actual power loss depends on the relative relationship of the interval of switching losses with respect to the overall period. The primary losses, however, comprise $I^2 \cdot R_{DS}$ conduction losses and $Q_G \cdot V_G$ gate drive losses as given by $$P_{loss} \approx P_{conduction} + P_{gate\text{-}drive} = I^2 R_{DS1} D + Q_G \cdot V_G \cdot f$$

In a DC/DC converter, the duty factor D is controlled by feedback to maintain a fixed output-to-input conversion ratio. For a fixed voltage input voltage, output voltage and load current, only frequency determines the weighting of these two loss components. At low frequencies gate drive losses dominate. At high frequencies switching losses dominate.

Worse yet, MOSFET device operation requires an unavoidable tradeoff between these losses. This intrinsic tradeoff can best be understood by converting graph 160 into graph 170 by swapping the ordinate and abscissa axes as shown in FIG. 3D. As shown, the $Q_G$ gate charge curve includes off portion 161, saturation portion 164, and linear region 162 just as in graph 160 where $Q_G$ increases proportionally with increasing $V_{GS}$. On the same graph 170, $R_{DS}$ on-resistance curve exhibits a hyperbolic dependence on gate drive, declining with increasing bias. At the edge of saturation, the on-resistance $R_{DS}$ declines rapidly (curve 171) into linear operation (curve 172) and reaches a minimum value (curve 173) at approximately a gate bias of $V_{GS\beta}$.

The tradeoff of on-resistance and gate-charge is illustrated by their product $Q_G \cdot R_{DS}$, shown by the dashed curve in graph 160. Since both terms contribute to loss, minimizing the $Q_G \cdot R_{DS}$ product represents the maximum converter efficiency and minimum power loss. In region 174, the $Q_G \cdot R_{DS}$ product declines because on-resistance 171 is dropping. In region 176 the $Q_G \cdot R_{DS}$ product increases because $Q_G$ is increasing. In between an optimum bias condition 175 exists where the $Q_G \cdot R_{DS}$ product is minimized. In a real converter, the $V_{GS}$ cannot be maintained at this optimum condition since $V_{GS}$ varies with the battery input voltage. In essence, the $Q_G \cdot R_{DS}$ product is a figure-of-merit for a given technology and device design.

Without redesigning the device and process, the only means to reduce the gate drive loss in its operation is to limit the maximum $V_{DS}$ during device operation. Unfortunately, the Buck and synchronous Buck converters impose the full battery input voltage $V_{batt}$ across the high-side MOSFET during switching, maximizing $\Delta Q_{DG}$ and the associated gate drive losses.

In contrast, the synchronous rectifier MOSFET does not change between conducting and non-conducting states with any significant drain bias, so its gate drives losses are not aggravated by the Miller effect and an excessive $\Delta Q_{DG}$ plateau.

Problems with Buck Converters

As shown above, a Buck converter exhibits poor efficiencies and excessive heating because of power dissipation in its rectifier. Schottky diodes suffer from excessive leakage and the risk of thermal runaway. Synchronous rectification eliminates the rectifier conduction losses and heating problems in conventional non-synchronous Buck converters, but cannot eliminate all the problems of a Buck converter.

Break-before-make operation, for example, needed to prevent shoot-through conduction in the high-side and low-side power MOSFETs, requires a dead time when both devices are momentarily off. During that interval, a P-N diode parallel to the synchronous rectifier MOSFET must carry the full inductor current and in so doing store charge. This stored charge leads to forced diode recovery causing a current path across the converter's input, and causes high dV/dt slew rates, voltage over-shoot, oscillations and noise—the same as in a non-synchronous Buck converter.

Moreover, eliminating the diode is not an option. Circuit 200 of FIG. 4A illustrates a Buck converter with the rectifier diode removed, comprising a high-side MOSFET 202 with an intrinsic parallel diode 205, an inductor 203 and an output capacitor 204. Unlike in a Buck or synchronous Buck converter, no diode is present between the node $V_x$ and ground. The resulting switching waveforms of operating circuit 200 are shown in graph 210 of FIG. 4B where once MOSFET 202 is turned on, the drain and inductor currents ramp linearly 211 while the voltage across MOSFET 202 is only $I_L(t) \cdot R_{DS(on)}$, meaning $V_x \approx V_{batt}$, as shown by curve 215.

At a time $t_1$, when MOSFET 202 is turned off, $V_X$ immediately exhibits a negative going voltage transient (curve 216) in order to maintain a constant inductor current (point 212). With no rectifier, the voltage at node Vx goes negative, below ground, without limitation until the $V_{DS1}$ across off-state MOSFET 202 exceeds the avalanche breakdown $BV_{DSS1}$ of diode 205, driving it into breakdown. The negative $V_x$ voltage overshoots and rings slightly (curve 217) until it settles at a voltage $V_x = (V_{batt} - BV_{DSS1})$. If MOSFET 202 is fragile, i.e. not robust, it will immediately exhibit snapback I-V characteristics and destroy itself. If MOSFET 202 is robust, it will sustain the breakdown voltage $BV_{DSS1}$ until the current ramps down to zero (curve 213) at time $t_2$, when MOSFET 202 ceases conduction At that time, inductor 203 behaves like a wire, not a current source and $V_x$ jumps up from point 218 to the capacitor voltage $V_{out}$ as shown by curve 219.

Such a device is referred to as a rugged power MOSFET. Rugged MOSFETs are rated by the magnitude of energy $E_j$ they can absorb before the silicon semiconductor or conductor materials in the MOSFET melt from overheating. A thermal failure is not considered a failure of ruggedness. Power device operation in this manner is known as unclamped inductive switching, or UIS, and is common in many solenoid and motor drives used in automotive applications. Because energy is dumped from inductor 203 into diode 205, UIS operation has very poor energy efficiency. So removing the rectifier diode from Buck converter is not a viable option.

Unfortunately leaving the rectifier diode in also creates problems, especially under light load conditions where it causes the inductor current to become intermittent. This phenomenon is illustrated in graph 225 of FIG. 5A. For a Buck converter operating at a high currents $I_{L(high)}$ the inductor current alternates in successive upward and downward ramps reaching a maximum current (point 227) and a minimum (point 226) both well above zero. At lower inductor currents $I_{L(mid)}$ the peak current (point 229) is well above zero but the minimum value (point 228) approaches zero.

Any inductor current $I_L$ below this minimum value causes the inductor current to become discontinuous. In such cases the inductor current has a positive peak current (point 231) but has a minimum value truncated to zero at points 230 and 232, the diode conduction time now being limited to a small percentage of the total period T and essentially conducting at a different frequency and duty factor than the off-time of MOSFET 236. Discontinuous conduction increases ripple and noise in the converter's output.

In a synchronous Buck converter operating in light load such as circuit 235 of FIG. 5B, care must also be taken to turn off low-side MOSFET 237 before the current reaches zero and $I_L$ reverses polarity. If the synchronous rectifier MOSFET remains on too long, the inductor current will reverse direction as shown by curve 233. A current reversal means current in inductor 239 will flow backwards from the load 242 and into the regulator, moving energy in the wrong direction away from load 241 and output capacitor 240 and into converter circuitry, during which efficiency suffers.

Circuit 235 will therefore oscillate with current $I_{L(forward)}$ flowing in part of the cycle and $I_{L(reverse)}$ flowing for the rest. Some electrical loads 241 do not operate properly under AC conditions. But sensing and shutting of synchronous rectifier MOSFET 237 is problematic because of noise on $V_x$ and because there is no easy way to accurately measure low magnitude currents in inductor 239. If MOSFET 237 is shut off too late, the inductor current reverses and energy is lost. If it is shut off prematurely, diode 238 has to carry current for a longer time and stores more charge. It also exhibits oscillations at the time the synchronous rectifier is shut off, lowering efficiency and generating noise.

Moreover, at very light loads the high side MOSFET's on-time becomes so short the entire converter is forced to operate at a variable frequency with almost no inductor current flowing, i.e. nearly off. Being nearly off makes it difficult to react to sudden changes in the load current and can lead to poor transient regulation, especially in light load operation.

SUMMARY

Prior art Buck and synchronous Buck switching regulators both suffer from numerous limitations intrinsic to their circuit topology adversely affecting efficiency, noise, stability and more. What is needed is an alternative step-down topology that ameliorates or eliminates problems such as rectifier switching and conduction losses, shoot-through conduction, stored charge and diode recovery, high dV/dt and voltage overshoot, high gate drive losses, current reversal.

BRIEF SUMMARY OF THE INVENTION

A DC/DC converter in accordance with this invention may be referred to as a freewheeling step-down converter. The converter comprises a high-side MOSFET, an inductor and an output capacitor, all of which are connected in series between an input terminal and a supply voltage terminal. A freewheeling clamp comprising a freewheeling diode and freewheeling MOSFET is connected in parallel with the inductor. The freewheeling diode is connected with its anode coupled to a node between the inductor and the output capacitor and its cathode coupled to a node between the high-side MOSFET and the inductor. Break-before-make (BBM) circuitry is connected to drive the gates of the high-side and freewheeling MOSFETs, respectively; and a pulse-width modulation circuit connected to drive the BBM circuitry. An output terminal of the converter is coupled to the a node between the inductor and the output capacitor. A load is supplied from the output terminal of the converter. Typically, a feedback circuit is connected between the output terminal and an input terminal of the pulse-width modulation circuit. Optionally, a clamping diode may be connected between the supply voltage terminal and the node between the high-side MOSFET and the inductor. The clamping diode has its anode connected to the supply voltage terminal and its cathode connected to the node between the high-side MOSFET and the inductor. In many embodiments the supply voltage terminal is biased at ground. Ground is a circuit ground that could be actual ground or any other voltage; the potential difference between $V_{batt}$ and ground represents the input DC voltage.

The converter of this invention operates as follows: In a first phase of operation, the high-side MOSFET is on and conducts a current from the input terminal to the inductor; the freewheeling MOSFET is off and freewheeling diode is reverse-biased so that no current flows through the freewheeling clamp. During the first phase, the inductor is magnetized. In a second phase of operation, the high-side MOSFET is turned off; a current begins to circulate through the freewheeling diode and consequently the voltage at the input terminal of the inductor drops to a level equal to one forward-biased diode-drop below the output voltage of the converter. The second phase may be referred to as the first break-before-make (BBM) interval because the high-side MOSFET has been turned off but the freewheeling MOSFET has not yet been turned on. In a third phase of operation, the freewheeling MOSFET turns on and diverts current from the freewheeling diode, reducing the voltage drop across the inductor to the mathematical product of the on-resistance of and current through the freewheeling MOSFET. Since this voltage product is typically very small, the voltage at the input terminal of the inductor is approximately equal to the output voltage of the converter during the third phase. During the fourth phase of operation, the freewheeling MOSFET is turned off again, and the voltage at the input terminal of the inductor rises to a level equal to one forward-biased diode-drop below the output voltage of the converter. The fourth phase may be referred to as the second break-before-make (BBM) interval because the freewheeling MOSFET has been turned off but the high-side MOSFET has not yet been turned on again. Since the voltage at the input terminal of the inductor is close to the output voltage of the converter during the second, third and fourth phases, relatively little current flows to the load during these phases. After the fourth phase, the high-side MOSFET is turned on again, and the cycle is repeated.

The benefits of the freewheeling step-down converter of this invention are numerous. For example, the converter experiences softer diode recovery and less voltage overshoot and noise than conventional Buck or synchronous Buck converters, The diode recovery current supplied to the freewheeling diode does not flow to ground but instead flows to the output capacitor and the load. So in a freewheeling step-down converter, even the diode recovery current supplies energy to the load, thereby improving converter efficiency. And the freewheeling step-down-converter also offers unique benefits during light-load operation. In this condition, when the load is drawing too little current to maintain the output voltage at a targeted value, the freewheeling step-down-converter can operate for extended durations in a condition whereby the high-side MOSFET remains off and inductor continues to recirculate current in the freewheeling clamp without affecting the polarity of the current in the load or in the output capacitor. By maintaining an inductor current greater than the average load current, regulation during load transients is significantly improved.

BRIEF DESCRIPTION OF THE SEVERAL VIEWS OF THE DRAWING

FIGS. 8A-8D are graphs showing waveforms of a freewheeling step-down converter, including the voltage $V_x$ at the inductor node (FIG. 8A), the inductor current $I_L$ (FIG. 8B), the current "hand-off" between the high-side MOSFET and the freewheeling clamp (FIG. 8C) and the voltage across the inductor $V_L$ (FIG. 8D).

DETAILED DESCRIPTION OF THE INVENTION

Figures 1A, 1B:
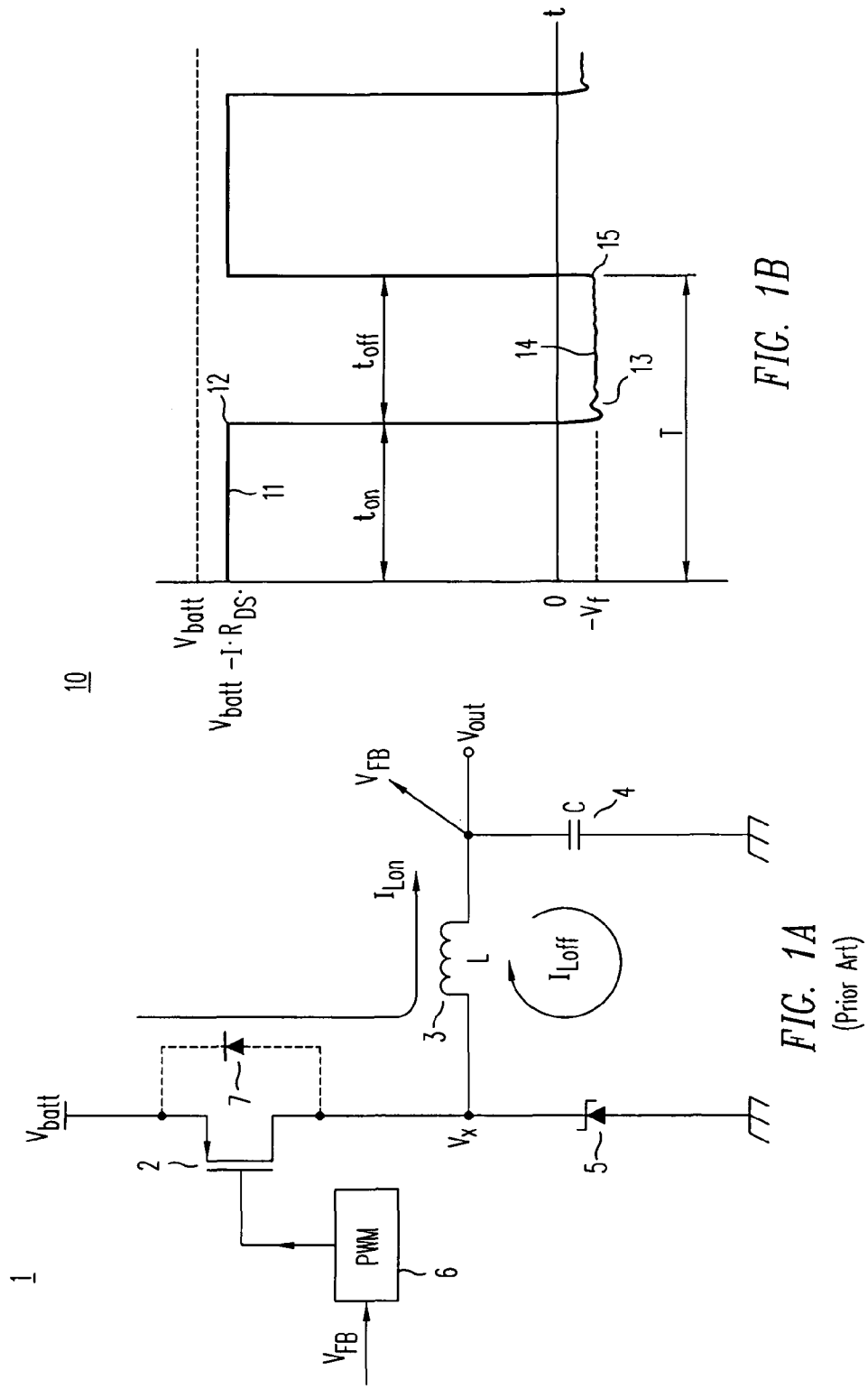
FIG. 1A is a circuit diagram of a conventional prior-art Buck switching regulator (A) schematic.
FIG. 1B is a graph showing switching waveforms in the Buck switching regulator.
Figures 2A, 2B:
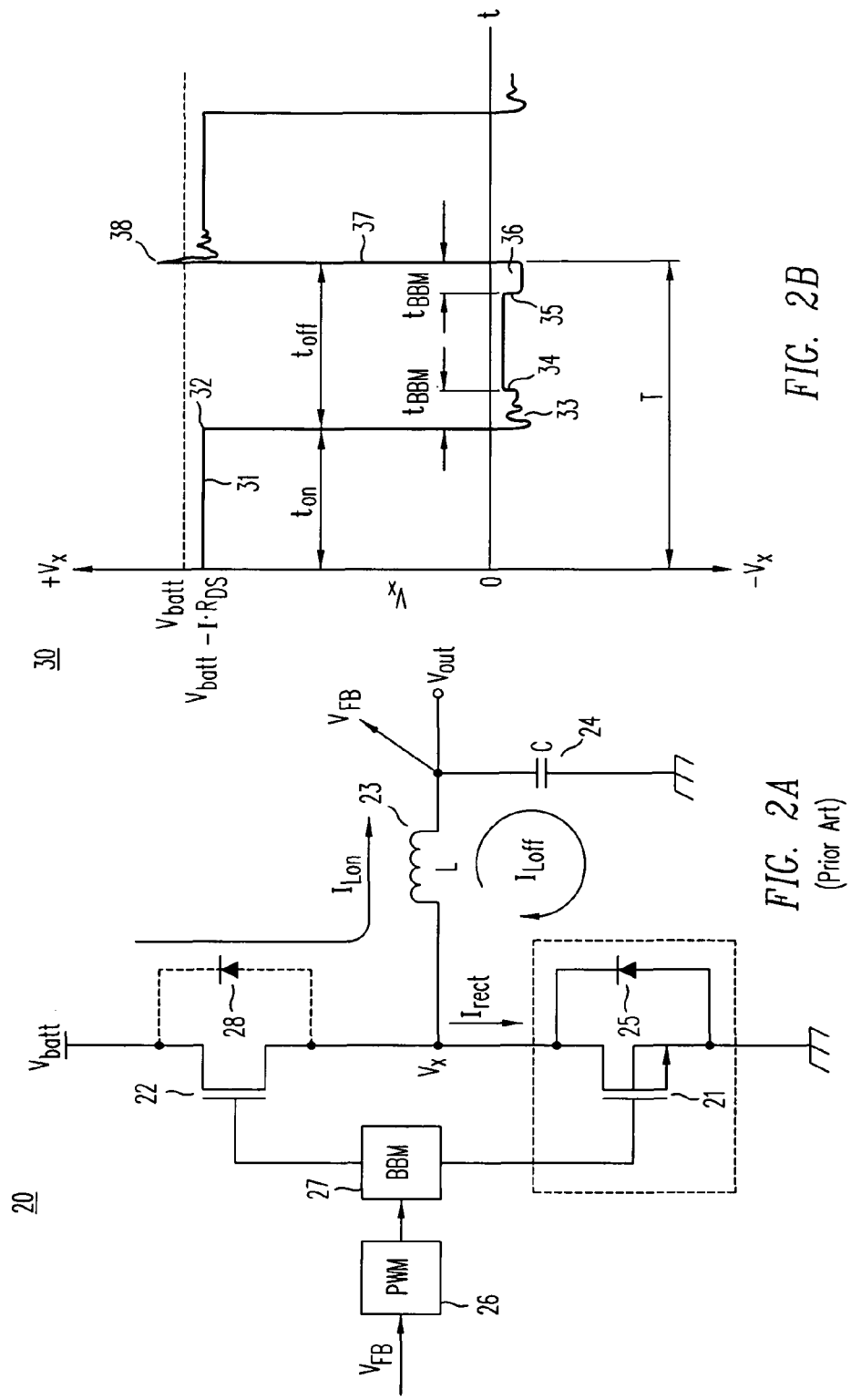
FIG. 2A is a circuit diagram of a conventional prior-art synchronous Buck switching regulator.
FIG. 2B is a graph showing switching waveforms in the synchronous Buck switching regulator.
Figure 2C:
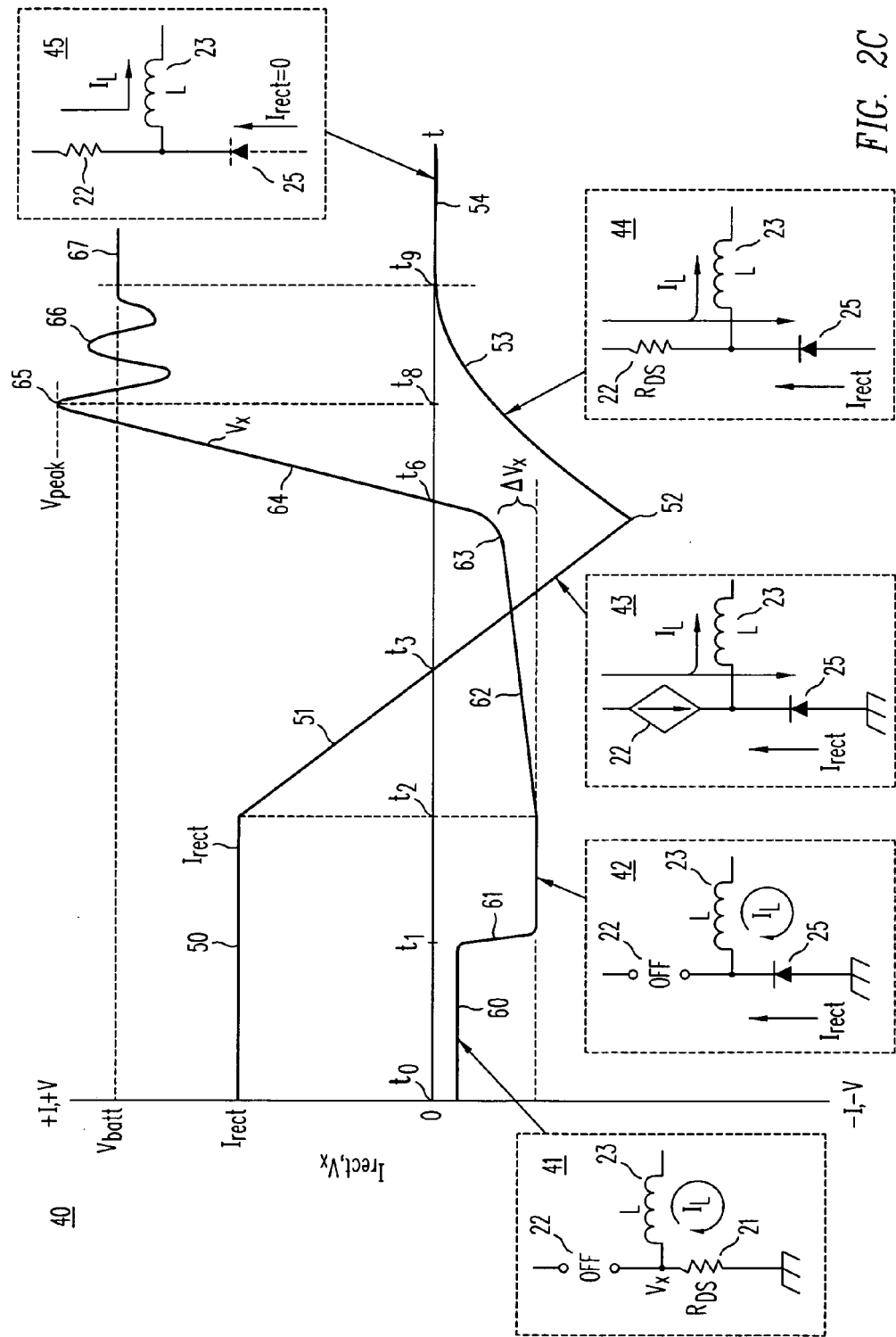
FIG. 2C is a graph showing waveforms during diode forced reverse recovery waveforms.
Figure 2D:
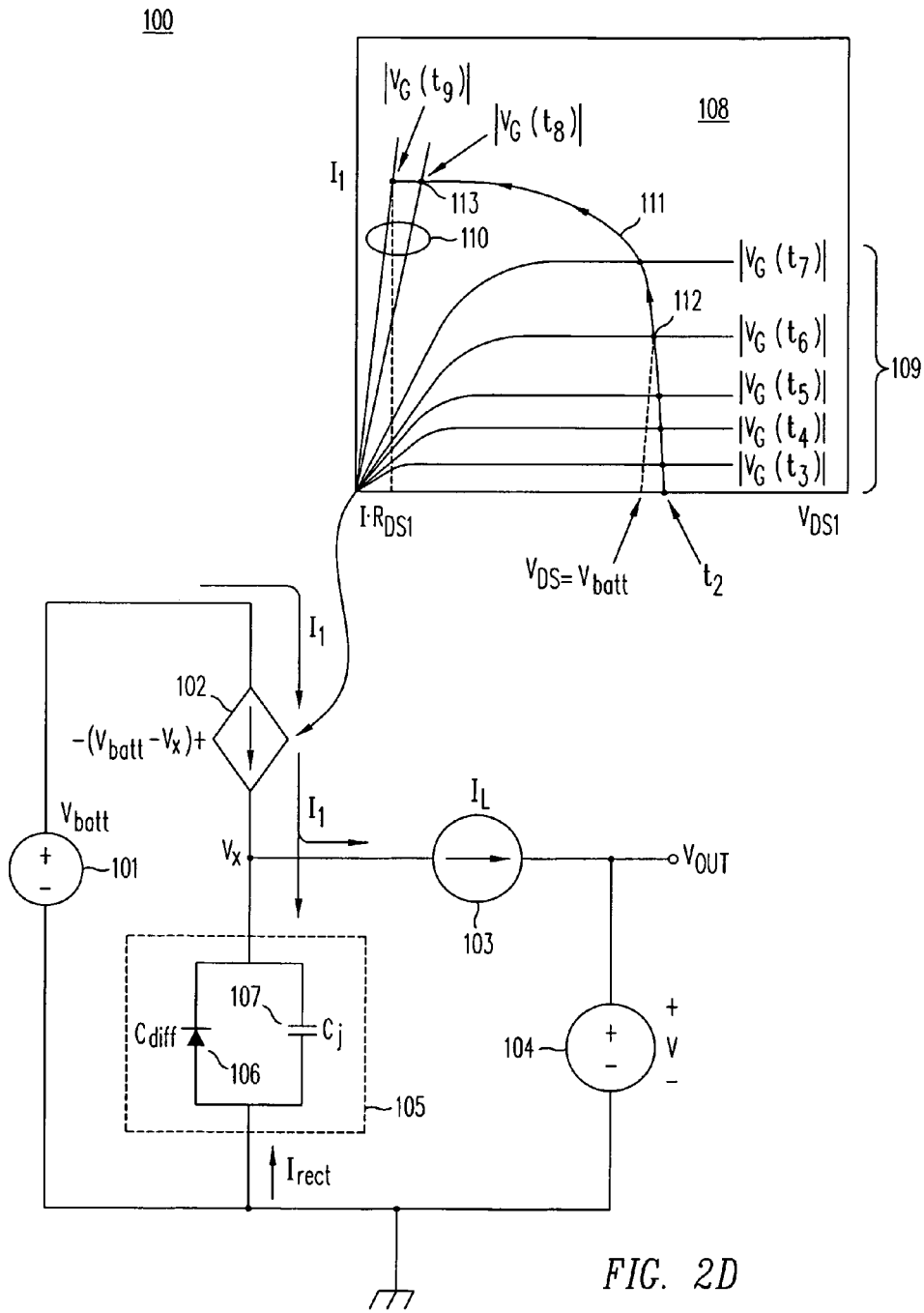
FIG. 2D is an equivalent circuit diagram of the forced diode recovery condition.
Figure 3A:
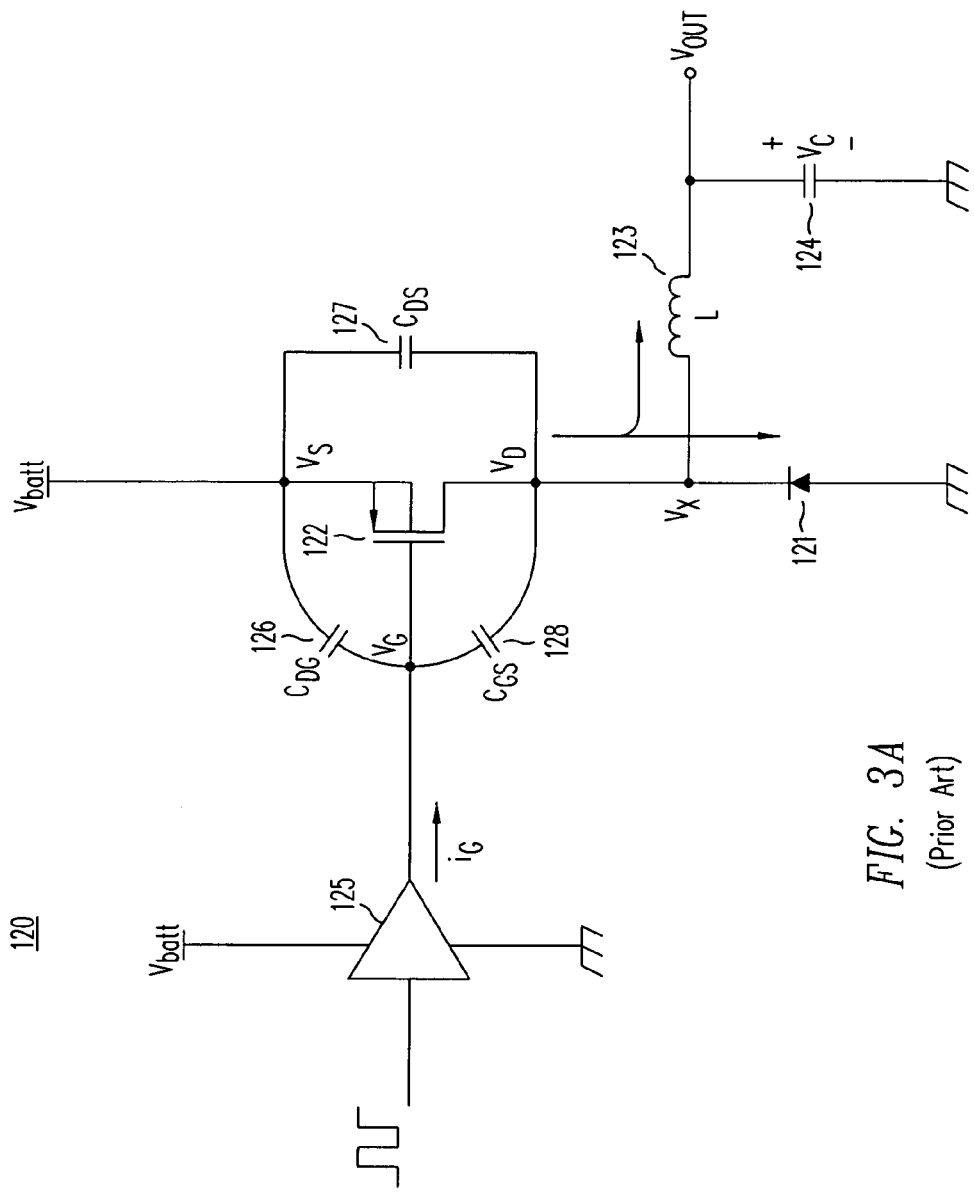
FIG. 3A is a circuit diagram showing the components contributing to gate-drive-related switching losses in common-source configured power MOSFET.
Figure 3B:
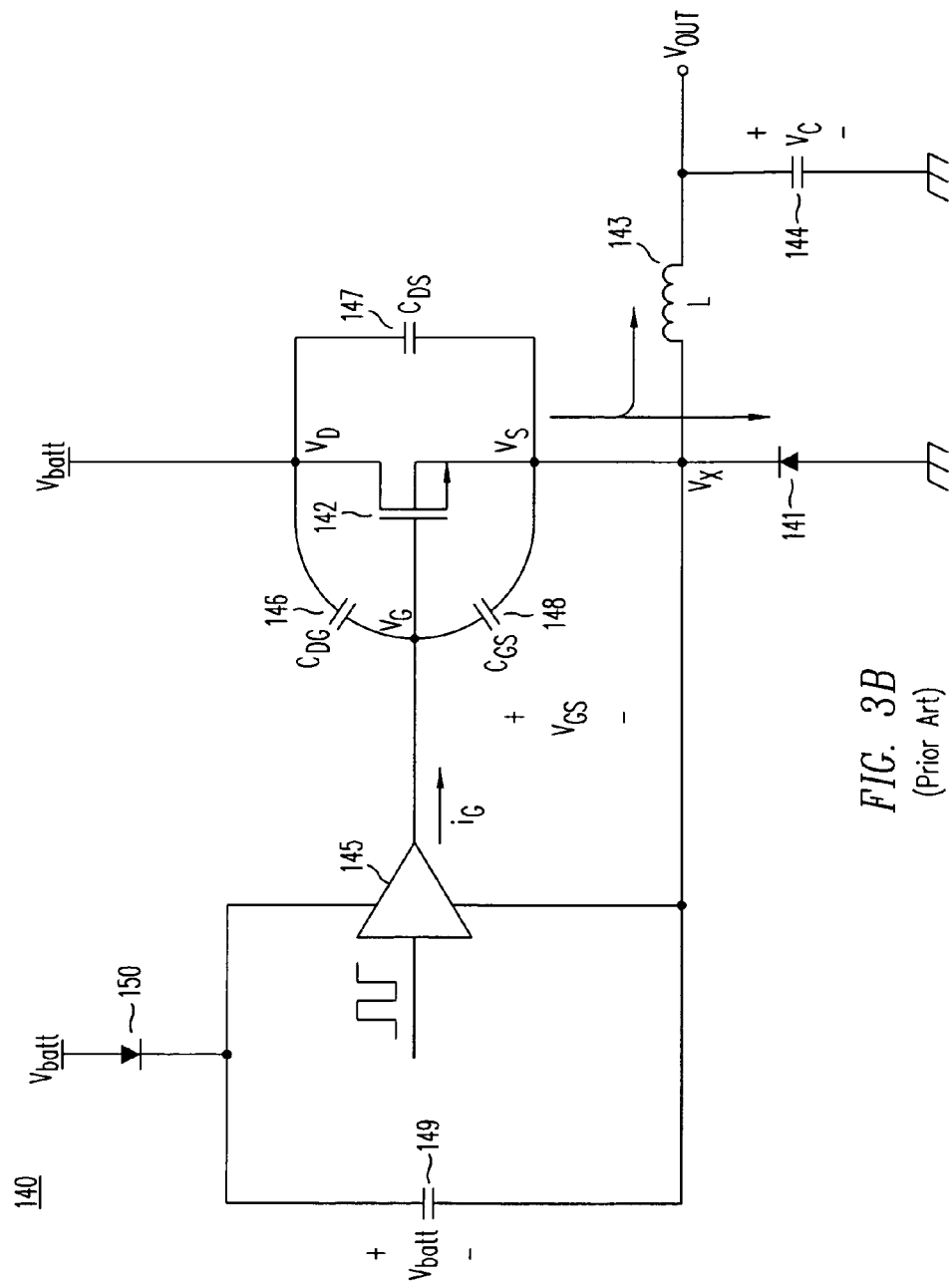
FIG. 3B is a circuit diagram showing the components contributing to gate-drive-related switching losses in source follower configured power MOSFET.
Figure 3C:
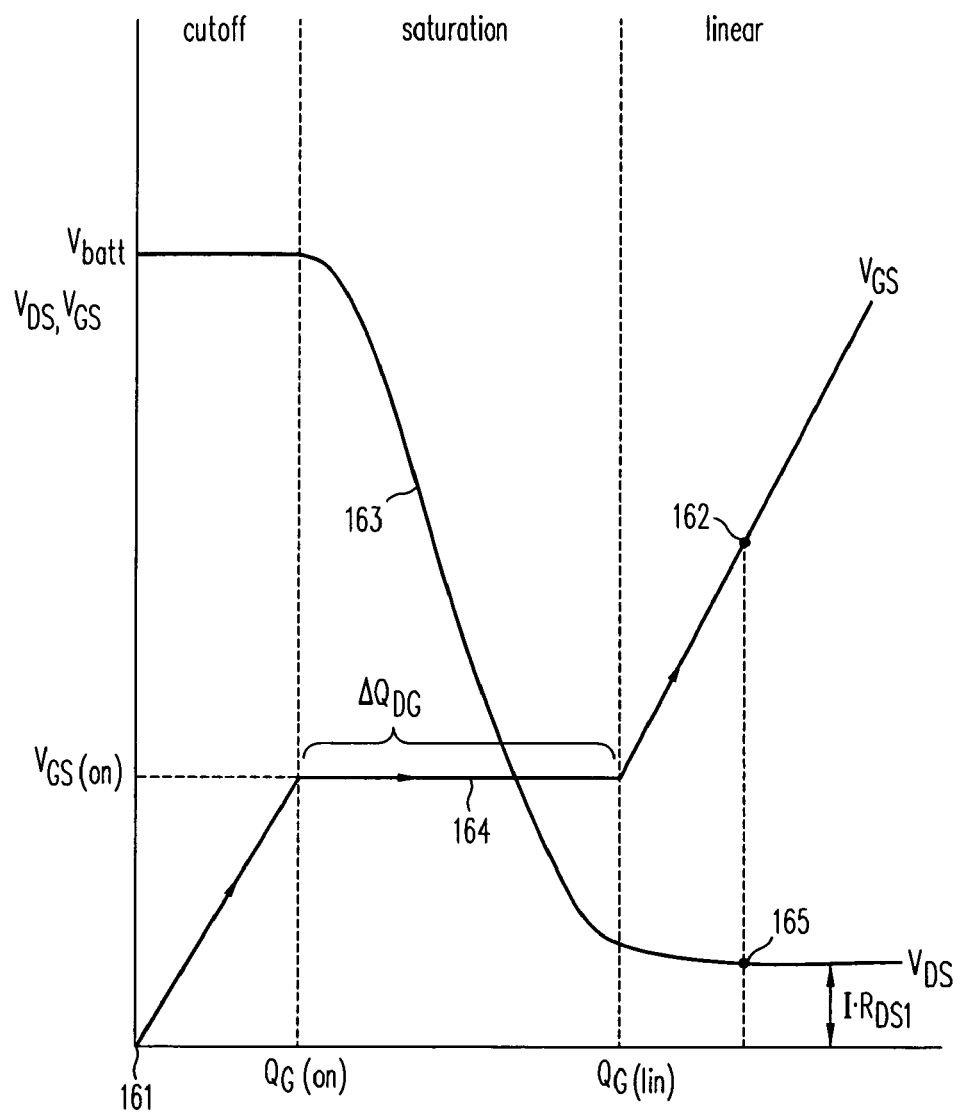
FIG. 3C is a graph showing $V_{GS}$ and $V_{DS}$ as a function of gate charge.
Figure 3D:
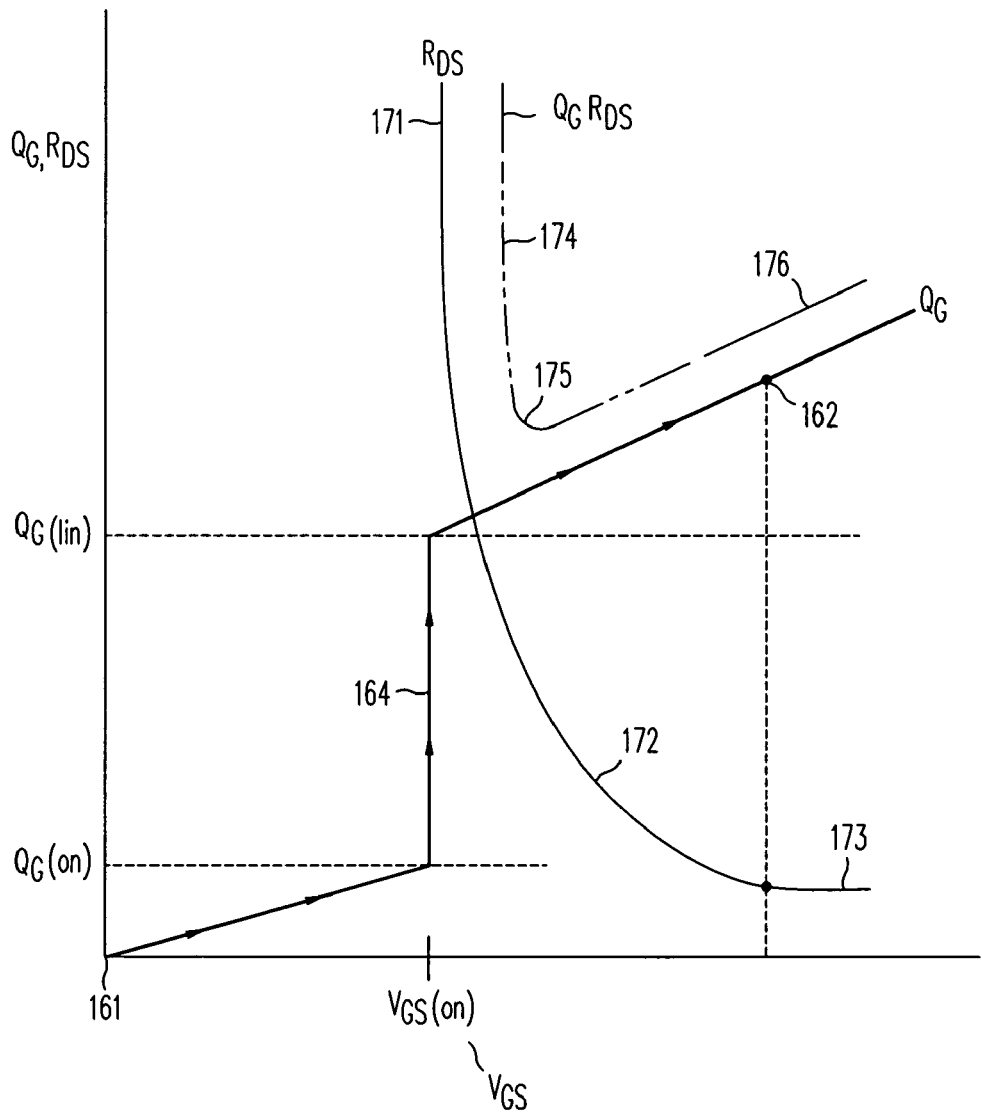
FIG. 3D is a graph showing the trade-off between on-resistance and gate-charge.
Figures 4A, 4B:
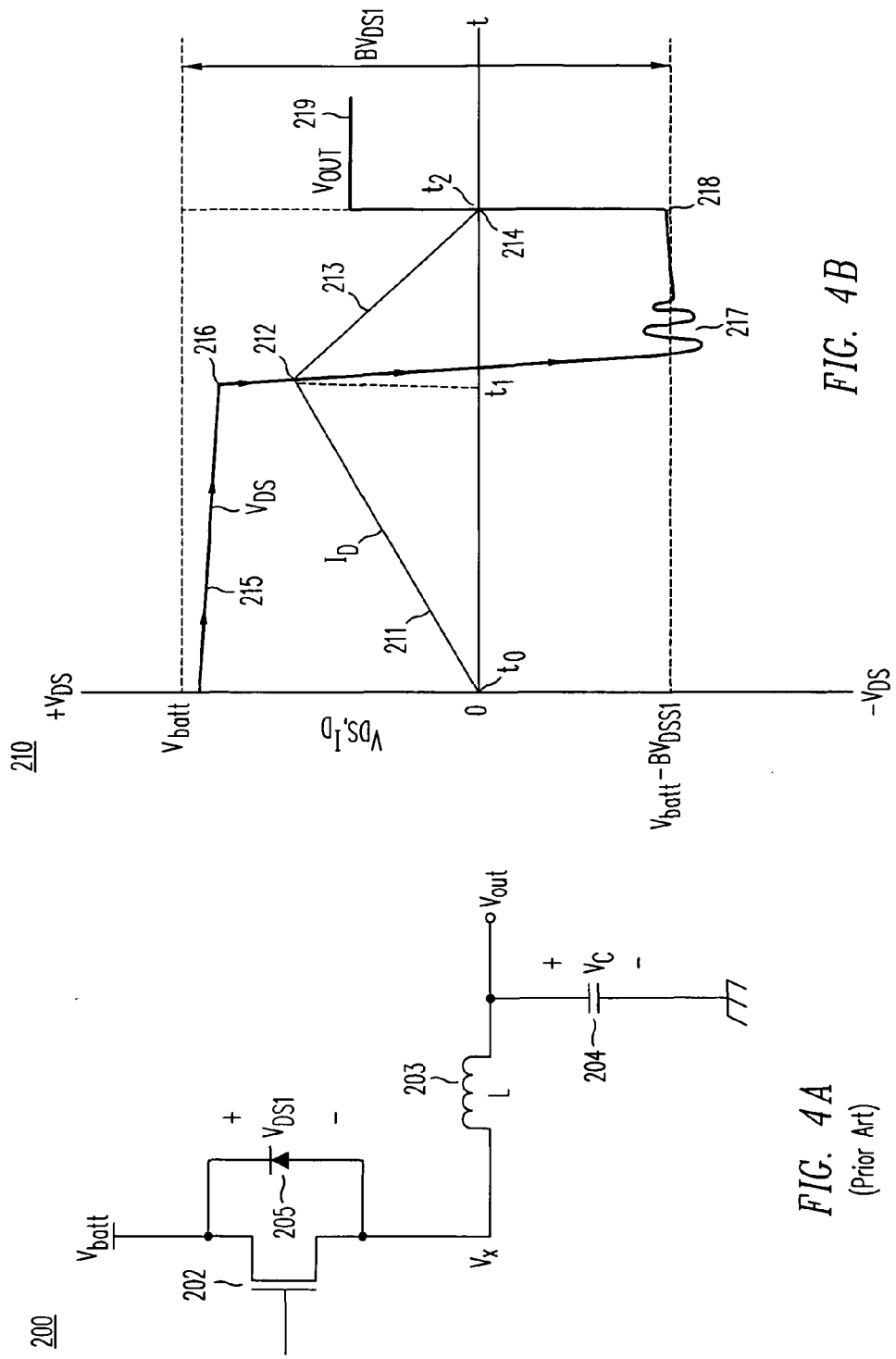
FIG. 4A is a circuit diagram showing unclamped inductive switching in a Buck converter without rectifier.
FIG. 4B is a graph of waveforms in the Buck converter of FIG. 4A.
Figure 5A:
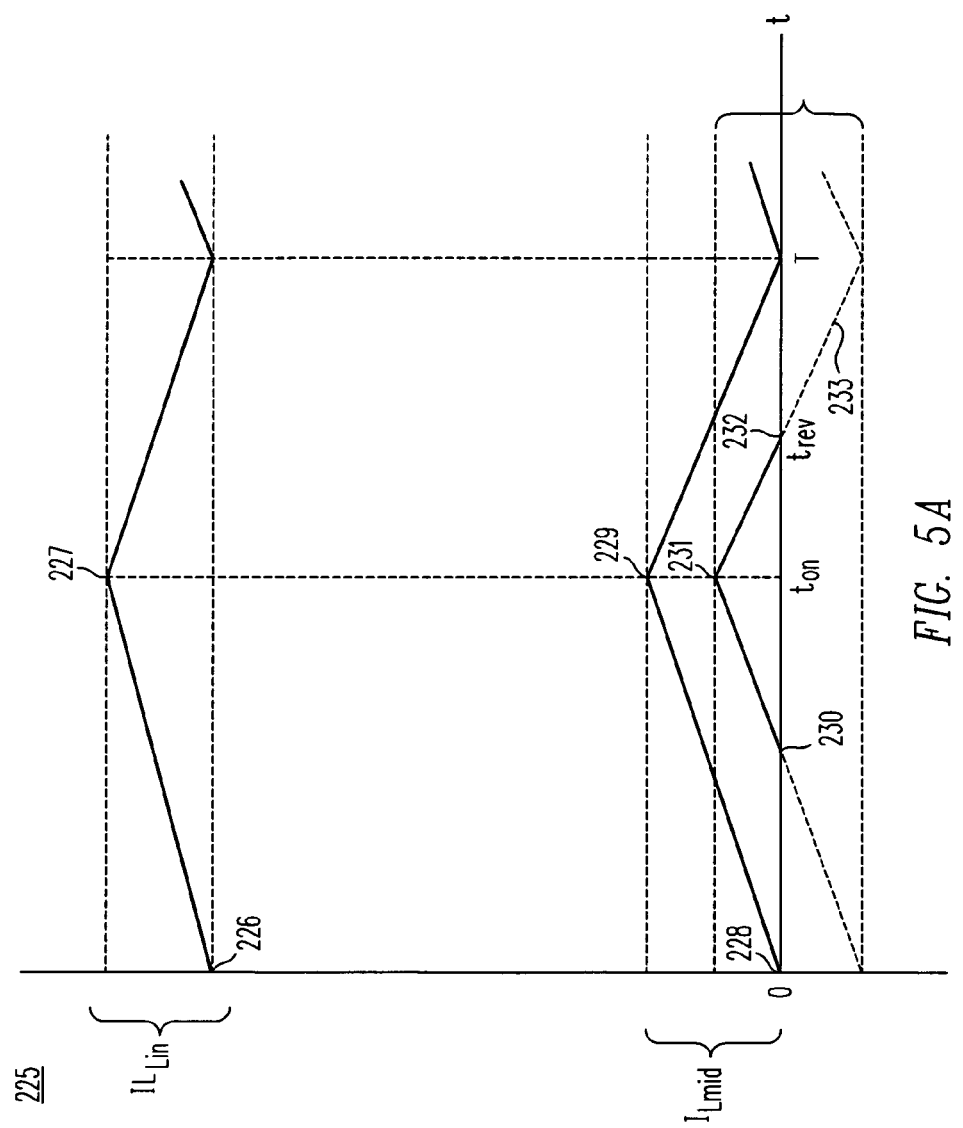
FIG. 5A is a graph showing discontinuous conduction in Buck converter during light-load operation.
Figure 5B:
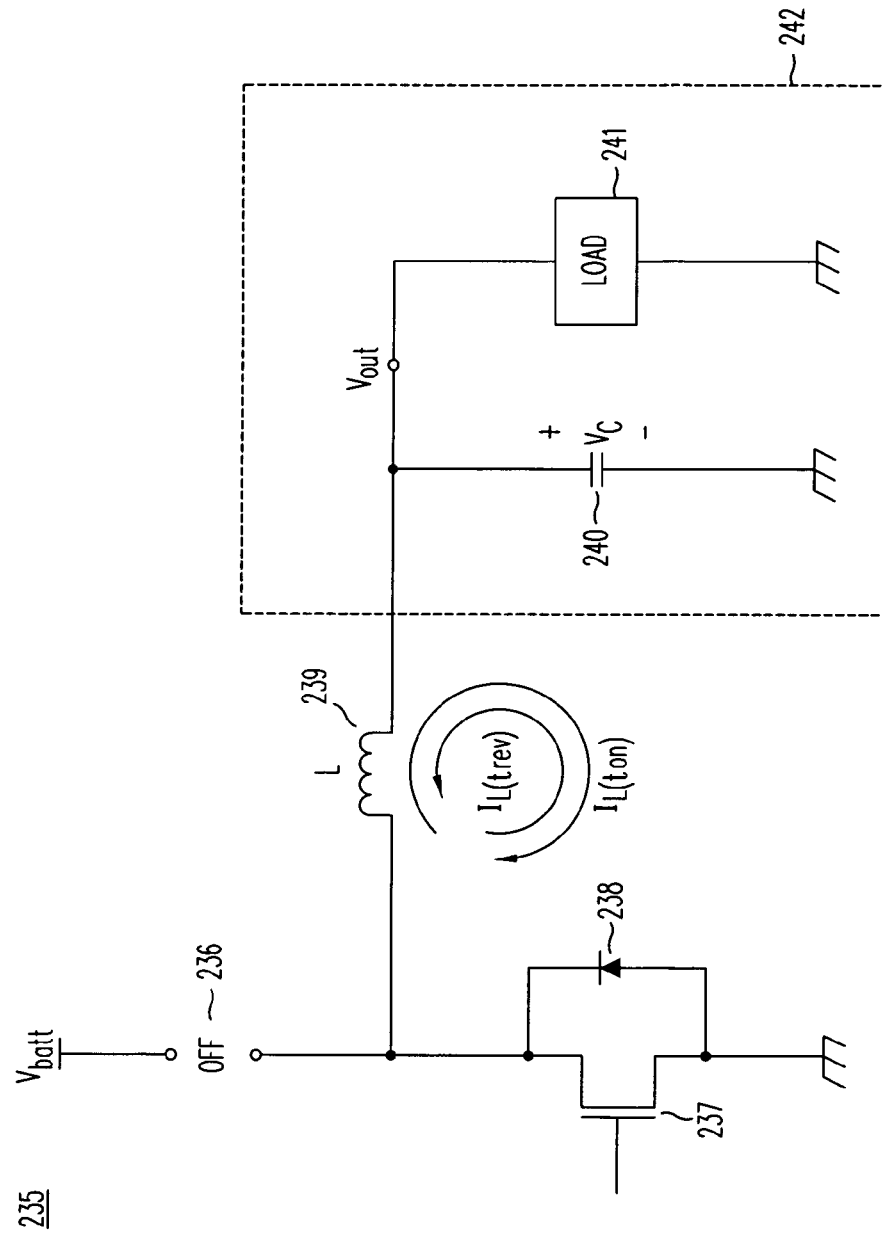
FIG. 5B is a circuit diagram showing current reversal in a synchronous Buck converter.
Figure 6:
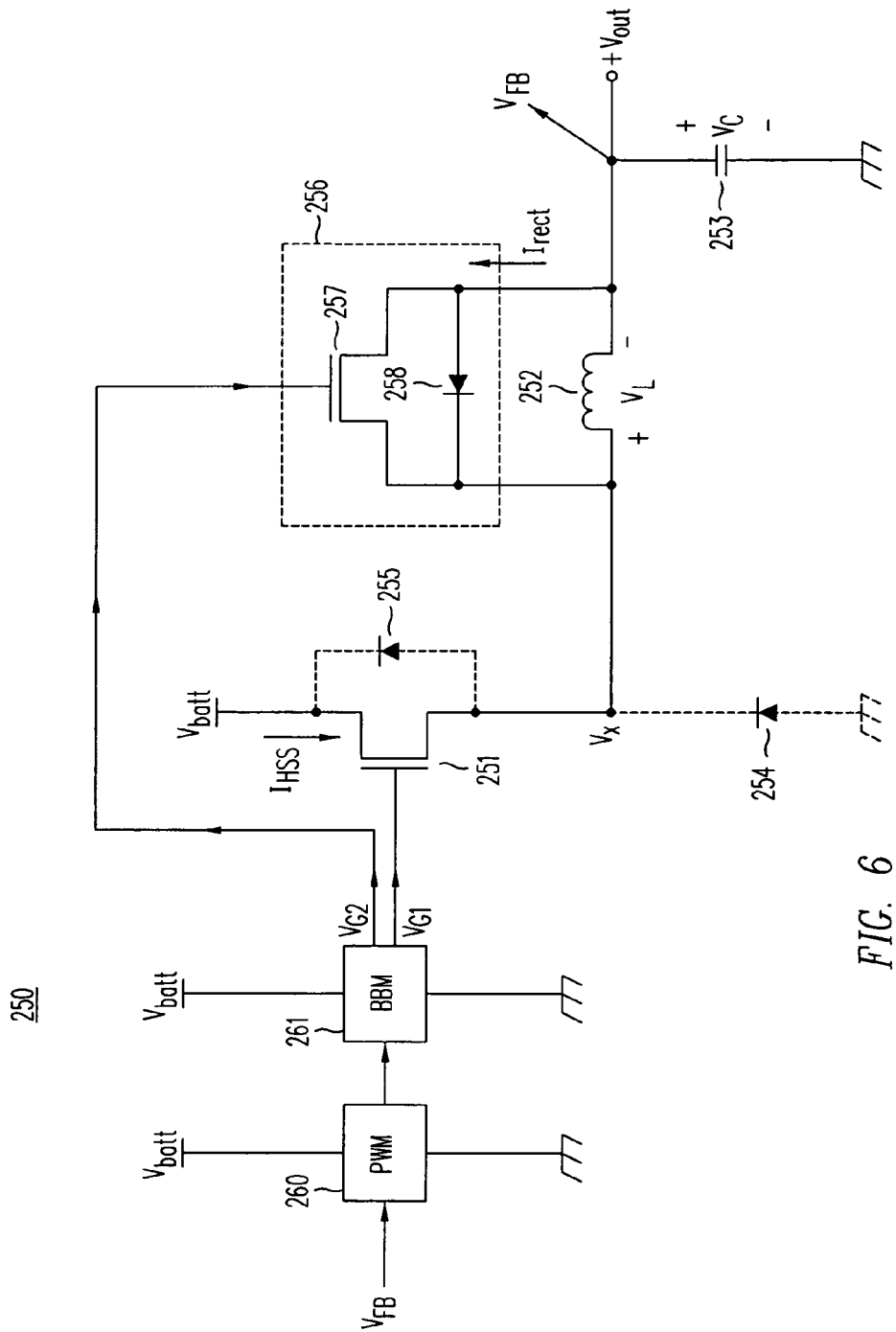
FIG. 6 is a circuit diagram of a freewheeling step-down converter in accordance with the invention.

FIG. 6 illustrates one embodiment of the freewheeling step-down converter and switching voltage regulator made in accordance with this invention. As shown, converter 250 comprises a high-side power MOSFET 251, an inductor 252, an output capacitor 253, a freewheeling clamp 256 comprising a diode 258 and a freewheeling power MOSFET 257, break-before-make (BBM) circuitry 261 and a pulse-width modulation (PWM) controller 260. Using feedback $V_{FB}$ from the output terminal of converter 250, operation of PWM controller 260 controls the on-time of MOSFETs 251 and 257 to regulate a specified output voltage $V_{OUT}$. Feedback circuitry for DC/DC converters is well known in the art and is described, for example, in application Ser. Nos. 11/890,818, now U.S. Pat. No. 7,782,027, titled "High-Efficiency DC/DC Voltage Converter Including Down Inductive Switching Pre-Regulator And Capacitive Switching Post-Converter," and Ser. No. 11/890,956, now U.S. Pat. No. 7,786,712, titled "High-Efficiency DC/DC Voltage Converter Including Up Inductive Switching Pre-Regulator And Capacitive Switching Post-Converter," each of which was filed Aug. 8, 2007 and is incorporated herein by reference in its entirety.

The output voltage $V_{OUT}$ is regulated over a specified range of input voltages, load currents, and temperature. In this regard converter 250 is a switching voltage regulator. All switching voltage regulators may also be considered voltage converters (although the converse is not necessarily true). No effort will be made to distinguish between a switching regulator and a switching converter.

In converter 250, high-side MOSFET 251 may be P-channel or N-channel MOSFET with appropriate changes in gate drive circuitry with BBM circuitry 261. Diode 255 is optional and may be intrinsic to MOSFET 251 provided that its cathode is connected to the positive input $V_{batt}$. As such, diode 253 remains reverse-biased during normal operation of converter 250.

Freewheeling MOSFET 257 may be a P-channel or N-channel MOSFET with appropriate changes in gate drive circuitry with BBM circuitry 261. In a preferred embodiment, freewheeling diode 258 is present and parallel to freewheeling MOSFET 257 provided that its anode is connected to the output $V_{OUT}$. Diode 258 may be intrinsic to MOSFET 251. Together they comprise a freewheeling clamp 256 that carries a current $I_{fw}$ when it is conducting.

During the normal operation of converter 250, freewheeling diode 258 alternates between being reverse-biased and forward-biased, depending on the conduction condition of high-side MOSFET 251. In a preferred embodiment, freewheeling MOSFET 257, has a sufficiently low on-resistance that when MOSFET 257 in its low-resistance "on" state, it diverts a significant portion of current flowing in freewheeling diode 258 through the channel of MOSFET 257 and results in a lower voltage drop across clamp 256 than when MOSFET is not conducting.

Diode 254 is optional and is not needed for operation of the freewheeling step-down converter. With its cathode connected to the $V_x$ node under normal operation, diode 254 remains reverse-biased and non-conducting. The presence of diode 254 may be an artifact of integrating MOSFETs 251 and 257 monolithically.

As described, the output voltage $V_{OUT}$ is controlled by the on-time of high-side MOSFET 251 relative to the switching period, whereby it follows the same voltage conversion equation described previously for a Buck converter, namely $$\frac{V_{out}}{V_{in}} = D \equiv \frac{t_{on}}{T}$$

where T is the period of a clock or ramp generator in PWM 260 and $V_{in}$ is the input labeled $V_{batt}$, which may be battery powered, or be powered by the output of any other power supply, DC/DC converter, AC/DC adapter, or power source within the specified operating voltage range of the components used to implement converter 250.

Since $t_{on}$<T the output voltage of freewheeling converter 250 is necessarily lower than its input voltage, so the regulator is strictly a step-down converter with a positive output limited between $V_{batt}$ and ground. Speed limitations of MOSFET switching practically limit duty factors between 5% and 95% for PWM clock frequencies up to several megahertz. Above that, the duty factor range becomes narrowed because of propagation delays in the control loop.

PWM controller 260 is not restricted to fixed frequencies, but may also be operated with varying frequencies, e.g. with fixed on-time and variable off-time or alternating between PWM and variable-frequency modes. It can also be operated in hysteretic mode, by charging the output capacitor 253 to some maximum voltage then letting it decay to some minimum value and repeating the cycle. Variable frequency or hysteretic operation, while consuming less current to operate typically exhibit an increased output ripple as compared with fixed frequency PWM operation.

Freewheeling Step-Down-Converter Operation

As described previously, using feedback $V_{FB}$ from the regulator's output, operation of PWM control circuit 260 controls the on-time of MOSFETs 251 and 257 to regulate a specified output voltage $V_{OUT}$.

The principle of operation of the freewheeling step-down converter is to control the current in inductor 252 with the on-time of high-side MOSFET 251 and to control the voltage transients at the $V_x$ node of inductor 252 by shunting the inductor current $I_L$ with a low-resistance freewheeling MOSFET 257 in parallel with inductor 252, with said freewheeling MOSFET conducting out-of-phase with high-side MOSFET 251. The sequence of operation for the freewheeling step-down converter is illustrated in FIGS. 7A-7D with the waveforms shown in FIGS. 8A-8D.

Figure 7A:
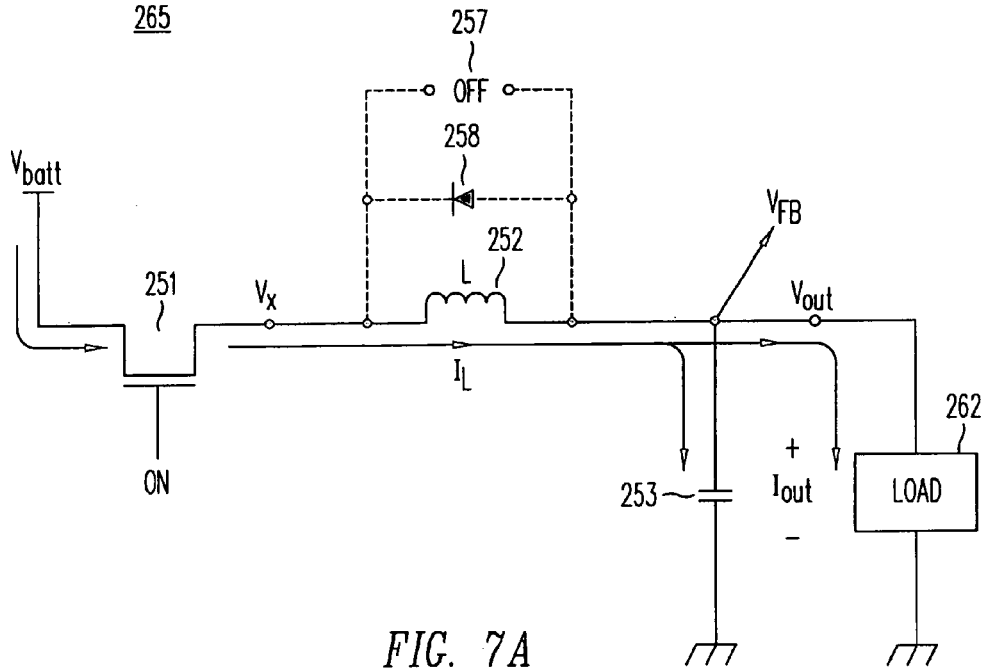
FIGS. 7A-7D are circuit diagrams describing the operating-modes of a freewheeling step-down converter, including the inductor being magnetized (FIG. 7A), the rectifier diode freewheeling (FIG. 7B), the MOSFET freewheeling (FIG. 7C) and the rectifier diode freewheeling (FIG. 7D).
Figure 8C:
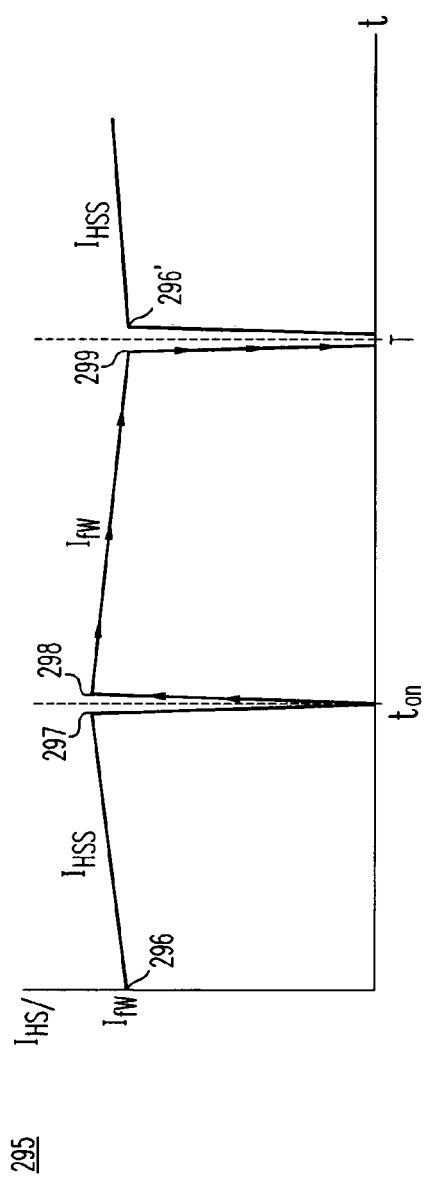

The first phase of operation, shown by circuit 265 in FIG. 7A, where high-side MOSFET 251 is on and conducting a current $I_{HS}=I_L$, freewheeling MOSFET 257 is off and freewheeling diode 258 is reverse-biased so that the current through the freewheeling clamp 256 ($I_{fw}$) is equal to zero. While high-side MOSFET 251 is conducting, $V_x$ (shown by curve 281 in FIG. 8A) is equal to $V_x=(V_{batt}-I_L \cdot R_{DS1})$, almost equal to $V_{batt}$. With no freewheeling current, then $I_{HS}=I_x=I_L=I_{OUT}$. The inductor current $I_L$ starts the cycle with a value 291 and ramps up to a value 292 as shown in FIG. 8B. The inductor current $I_L$ is also equal to the high-side MOSFET current $I_{HS}$ (values 296 and 297, respectively) shown in FIG. 8C.

During this cycle the output voltage $V_{out}$ is controlled by the inductor current $I_L$ feeding capacitor 253. The charge dQ (in coulombs) delivered to output capacitor 253 per cycle is then $$dQ_c = I_y \cdot t_{on} = I_L \cdot t_{on}$$

and since $dV_c = dQ_c/C$, then the incremental change in the output capacitor's voltage $dV_c$ is given by $$dV_c = \frac{I_L \cdot t_{on}}{C}$$

As a result, the on-time $t_{on}$ of MOSFET 251 determines the quantity of charge delivered to the load and output capacitor in any one cycle. As shown in graph 300 of FIG. 8D, the voltage across inductor 252 (curve 301) is given by $V_L = ((V_{batt}-I_L \cdot R_{DS1})-V_{OUT}) \approx (V_{batt}-V_{OUT})$, where $R_{DS1}$ is the on-resistance of high-side MOSFET 251.

Figure 7B:
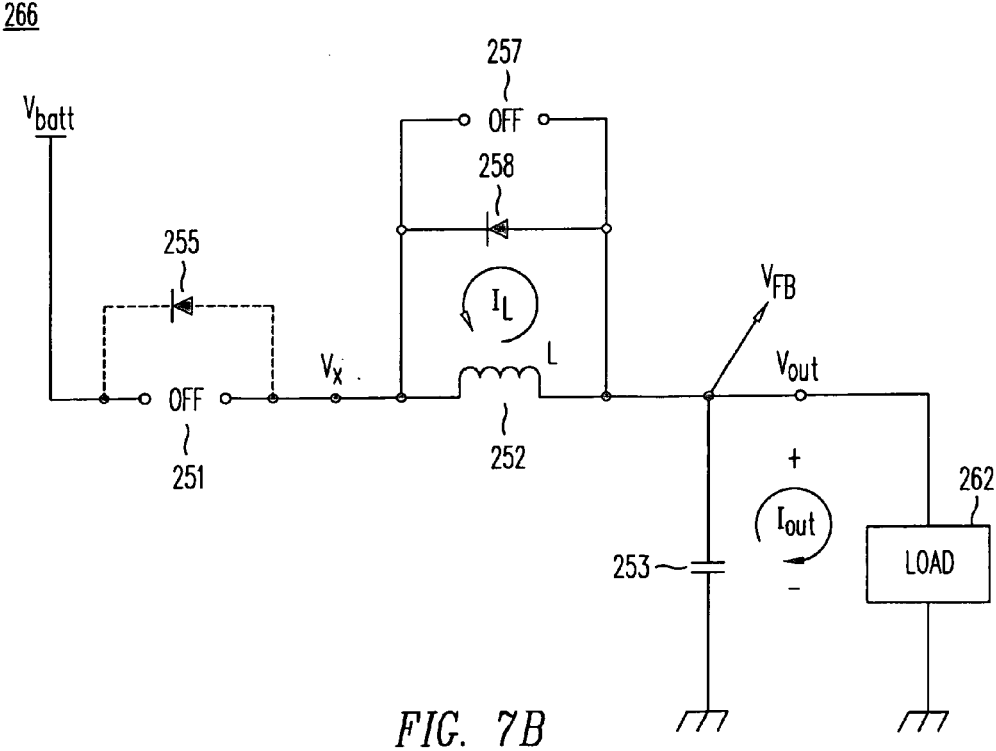
Figure 8D:
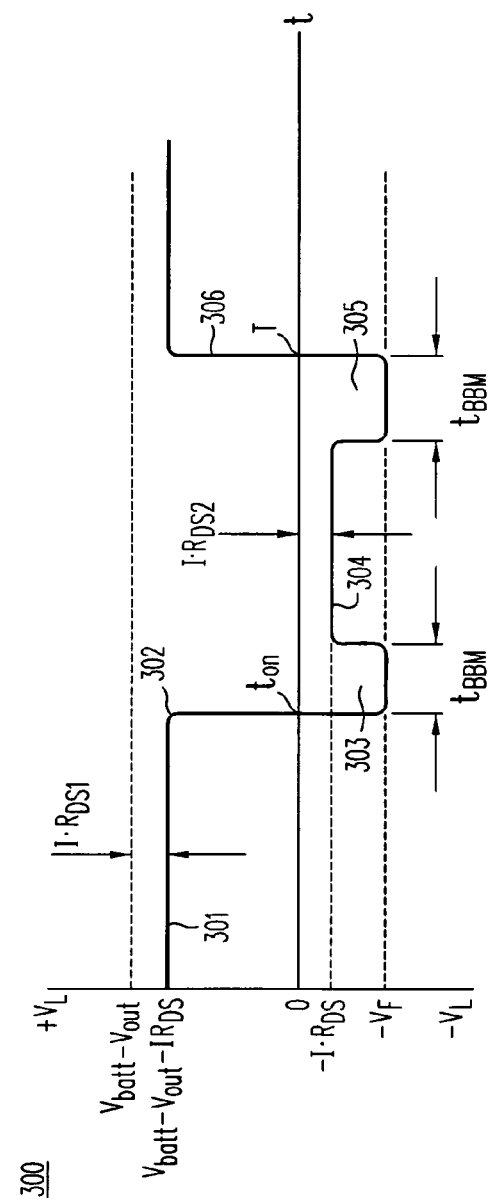

Circuit 266 of FIG. 7B illustrates the second phase in the operation of the freewheeling step-down converter 250. As shown in FIG. 8A, immediately after MOSFET 251 is shut off at time $t_{on}$, $V_x$ immediately drops to a level equal to one forward-biased diode-drop $V_f$ below the output, or $(V_{out}-V_f)$. As shown in FIG. 8D, this transition (curve 302) reverses the polarity of the voltage $V_L$ across inductor 252 but does not drive $V_x$ below ground as in a conventional Buck converter.

Since freewheeling diode 258 acts as a self-timed voltage-clamp and current-shunt by carrying the current through inductor 252 any time both MOSFETs 251 and 257 are off, e.g. during the break-before-make interval, the timing of conduction in freewheeling MOSFET 257 is less critical. During this phase, the current $I_{HS}$ in high-side MOSFET 251 (current 297 in FIG. 8C), which is equal in magnitude to inductor current $I_L$ in inductor 252 (current 292 in FIG. 8B) is "handed off" to the freewheeling clamp 256 (current 298 in FIG. 8C).

In greater detail, once MOSFET 251 is off and $I_{HS}=I_x=0$, the freewheeling clamp 256 carries the full current through inductor 252, so $I_L \approx I_{fw}$. Accordingly, inductor 252 cannot force the voltage $V_{out}$ or $V_x$ to change during this period because the current at the output terminal ($I_{OUT}$) is approximately equal to zero and the current at the $V_x$ node ($I_x$) is also approximately equal to zero. Because the current through inductor 252 is shunted, inductor 252 cannot supply current to any other circuit elements or force the voltage on the output terminal or $V_x$ pins to move. As shown in FIG. 8A, this condition persists for a BBM interval 283 of duration $t_{BBM}$, as determined by BBM circuitry 261.

Figure 7C:
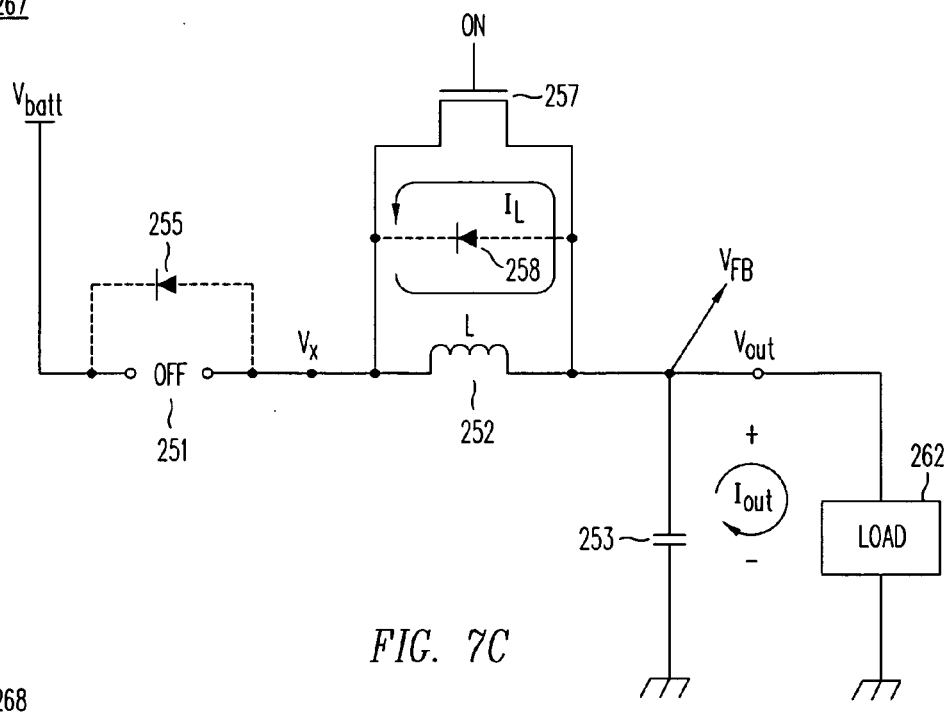
Figure 7D:
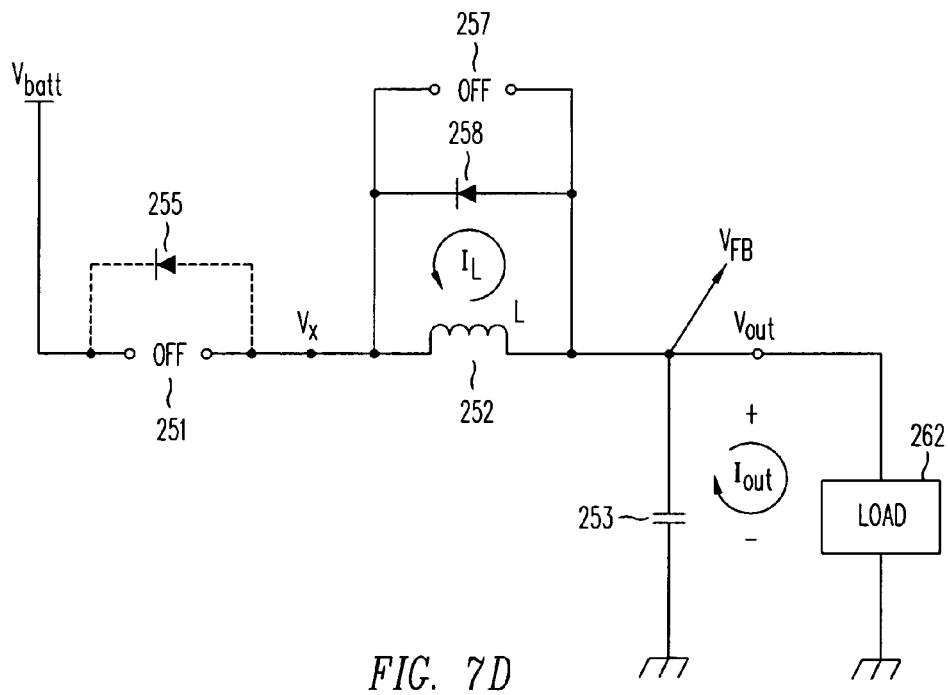

In the third phase of operation, shown in FIG. 7C, after the BBM interval 283, freewheeling MOSFET 257 turns on and diverts current from diode 258, reducing the voltage drop 304 across conducting freewheeling clamp 256 from $-V_f$ down to $-I_L \cdot R_{DS2}$, where $R_{DS2}$ is the on-resistance of MOSFET 257. During this time, $V_x$ is approximately equal to $V_{OUT}$. Under PWM control, MOSFET 257 is turned off in a fourth phase of operation for a duration $t_{BBM}$ as shown in FIG. 7D, during which time diode 258 carries the inductor current $I_L$.

At time T, the period of the clock, the cycle repeats with high-side MOSFET 251 turning on, $V_x$ jumping from $\sim V_{out}$ to $\sim V_{batt}$, the polarity across the inductor 252 returning to a positive value, and the free-wheeling clamp 256 "handing" its current $I_{fw}$ (point 299) back to the high-side MOSFET 251 (point 296), as shown in FIG. 8C.

Comparing the operation of freewheeling converter 250 to the operation of a conventional Buck or synchronous Buck converter, some notable differences are evident. The $V_x$ node never goes outside the supply rails but rather (neglecting MOSFET on-resistance) transitions between the input-voltage $V_{batt}$ and the output voltage $V_{OUT}$ (not ground). The smaller voltage range ($V_{batt}$-$V_{out}$) reduces gate charge and gate drive losses and lowers the stresses on diode 258 during forced diode recovery.

Also, unlike in a Buck converter, in freewheeling converter 250, inductor 252 delivers its current $I_L$ to the output terminal and to capacitor 253 only when high-side MOSFET 251 is on and conducting. During the freewheeling stage, when high-side MOSFET is off (the second, third and fourth phases above), the inductor current is maintained continuously and does not interact with the load, avoiding issues with polarity reversal and noise in the load.

Reduced Diode Recovery Stress and Losses

Graph 300 in FIG. 8D illustrates the voltage $V_L$ across inductor 252. In the disclosed freewheeling step-down-converter, $V_L$ is also the voltage across freewheeling diode 258 and freewheeling MOSFET 257. The waveform shown in FIG. 8D is therefore meaningful during any transient that results in forced diode recovery, i.e. a large voltage transient following a break-before-make (BBM) interval.

Such a case occurs immediately after BBM interval 305, when at time T, the inductor voltage $V_L$ flies up in a transient 306 and imposes a reverse bias of $\sim V_{batt}$ across P-N diode 258 immediately after a forward current has been flowing in the diode 258. As such, some diode recovery stress is expected at the conclusion of the fourth phase of operation.

Figure 9A:
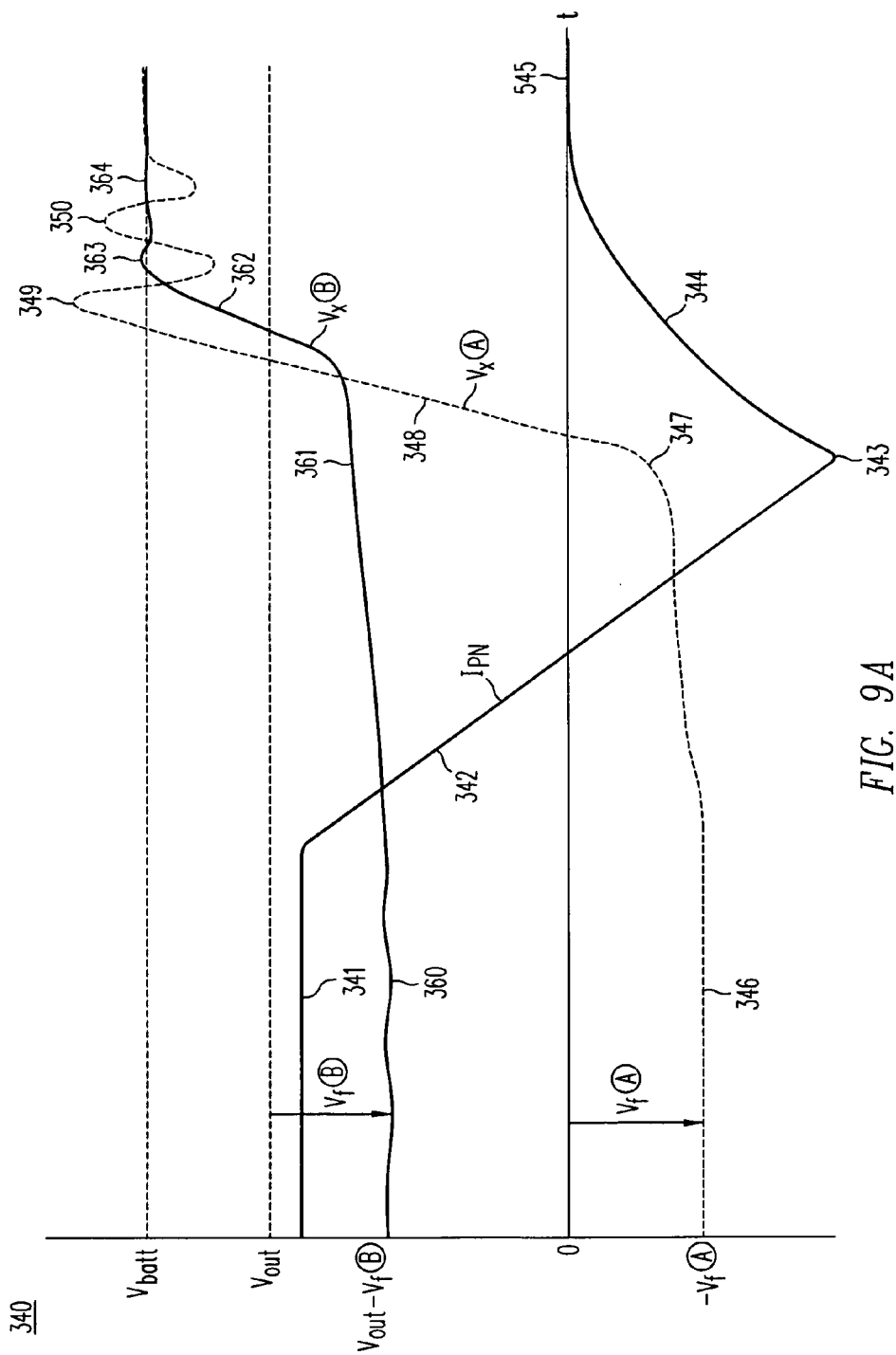
FIG. 9A shows superimposed current and voltage waveforms during forced diode recovery in a freewheeling step-down converter.

Graph 340 of FIG. 9A expands this operating region, illustrating the diode recovery current waveform $I_{PN}$ plotted against time. The waveform of $I_{PN}$ is similar to the waveform of the current during forced diode recovery in a conventional Buck converter, starting with a forward-bias current through diode 258 (curve 341), a region of fixed dI/dt (curve 342), where the high-side MOSFET 251 turns back on, a peak reverse current (point 343), and finally a decay in reverse current as the stored charge dissipates (curve 344). Even assuming identical current waveforms for the prior-art Buck and the disclosed freewheeling converters, the corresponding voltage waveforms are substantially different, a consequence of differing circuit topologies during diode recovery.

Figure 9B:
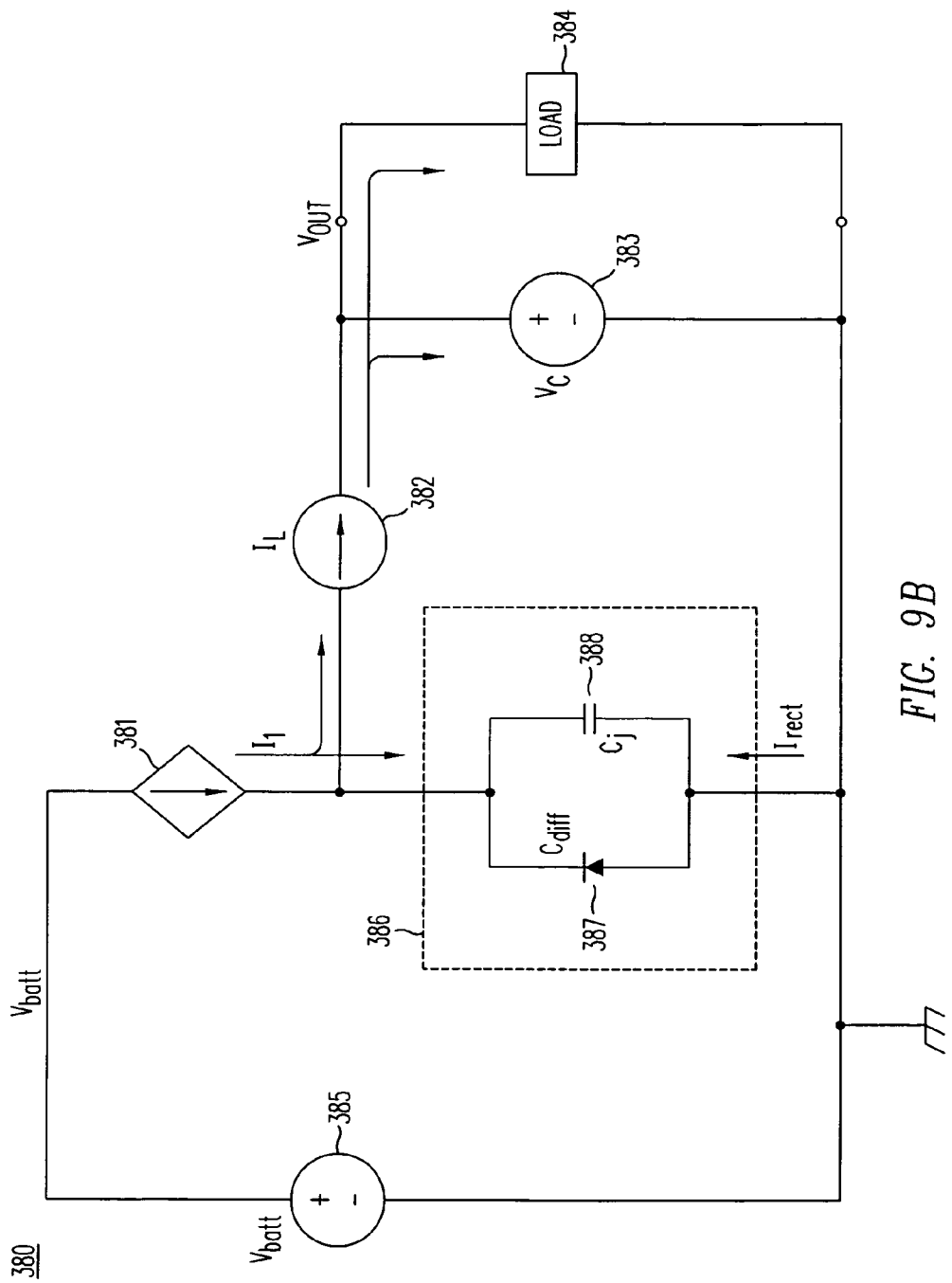
FIG. 9B is an equivalent circuit diagram for a conventional Buck converter.

As shown in the equivalent circuit diagram of FIG. 9B, a conventional Buck or synchronous Buck converter 380 during diode recovery comprises a controlled current source 381 representing the high-side MOSFET connected to the positive terminal 385 at $V_{batt}$, the ground-connected diode 386 under reverse recovery (where diode 386 is represented by the parallel combination of a P-N diode 387 and a capacitor 388), a fixed current source 382 representing the inductor current $I_L$, a voltage source 383 representing the converter's output capacitor charged to a voltage $V_c = V_{out}$, and a load 384.

Under forward-bias conditions prior to diode recovery, diode 387 is conducting and a forward-bias $V_f$ develops across diode 387. Since the anode of diode 387 is grounded, under forward-bias, the voltage $V_x$ is below ground, as shown by curve 346 in graph 340.

Diode 386 under recovery 386 is represented as a parallel combination of a capacitor 388 and a P-N diode 387. Capacitor 388 represents the voltage-dependent junction capacitance $C_j(V_x)$ without any minority carrier charge storage. The P-N diode 387 represents the diffusion capacitance associated with stored minority carriers in a P-N junction diode during or immediately after being forward-biased. The total current $I_{rect}$ includes conduction current as well as any current in both depletion and diffusion capacitances, or $$I_{rect} = I_{cond} + C_j \frac{dV_j}{dt} + (I_{recomb} + I_{extract})$$

The displacement current ($C_j \cdot dV_j/dt$) charges or discharges the junction capacitance causing the space charge or depletion region to widen or narrow with junction voltage. The recombination current describes the normal recombination of minority carriers depending on the minority carrier lifetime of the semiconductor material. The extraction current describes minority carriers diffusing into the depletion region and being transported to the other side of the junction, i.e. becoming majority carriers.

The complication of this equation is the junction bias affects the current and the current affects the junction bias, comprising a type of internal feedback with the junction. It is this effect that holds the voltage across the junction somewhat constant even while removing minority carriers from the device as shown by curve 347. Eventually, as the last minority carriers are removed, the voltage $V_{x(rect)}$ rises rapidly from $-V_f$ up to $V_{batt}$ at a high dV/dt slew rate. The voltage overshoots (point 349), rings (curve 350) and finally settles at $V_x = V_{batt}$.

One significant aspect of the Buck topology is that the high-side current source 381 and the recovering diode 386 essentially short out the power supply 385 during the reverse recovery of the rectifier diode 386. The recovery occurs with nearly the full battery input voltage supplying the current, an extremely harsh bias condition for diode recovery. The freewheeling step-down converter of FIG. 9C, in contrast, exhibits milder recovery conditions.

Figure 9C:
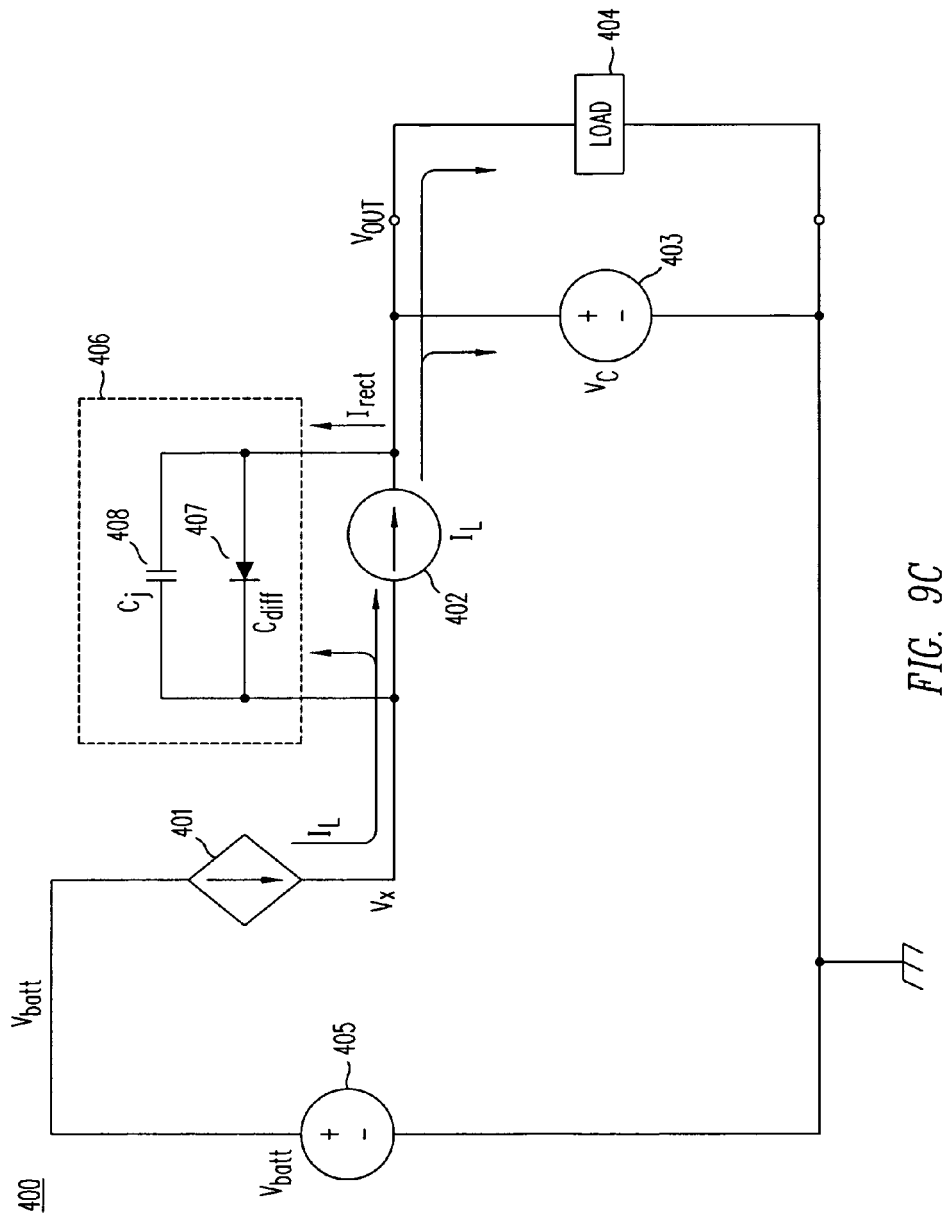
FIG. 9C is an equivalent circuit diagram for a freewheeling step-down converter.

As shown in the equivalent circuit diagram of FIG. 9C, a freewheeling step-down-converter 400 during diode recovery comprises a controlled current source 401 representing the high-side MOSFET connected to the positive terminal 405 at $V_{batt}$, the output-connected diode 406 under reverse recovery (represented by a parallel combination of a P-N diode 407 and a capacitor 408), a fixed current source 402 representing the inductor current $I_L$, a voltage source 403 representing the converter's output capacitor charged to a voltage $V_c = V_{out}$, and a load 404.

Under forward-bias conditions prior to diode recovery, diode 407 is conducting and develops a forward-bias $V_f$ across it. But since the anode of diode 407 is not grounded but instead is tied to the output voltage, under forward-bias the voltage $V_x$ is not below ground as it is in a Buck converter (curve 346), but it is one forward-voltage drop below the output voltage (i.e., $V_x=(V_{out}-V_f)$), as shown by curve 360 in graph 340.

As in the case of the Buck converter, junction capacitance 408 and diffusion capacitance hold the $V_x$ voltage semi-constant (curve 361) while diode 406 recovers but afterwards the net bias driving diode recovery is only $(V_{batt}-V_{out})$ and not the full input voltage as it is in the Buck converter. With lower applied voltages, the diode recovery is softer having a lower slew rate (curve 362), less overshoot (point 363), and minimal ringing (curve 364).

Another benefit in addition to softer recovery and less overshoot, the diode recovery current $I_{fw}$ supplied by high-side MOSFET 401 to diode 406, does not flow to ground but to output capacitor 403 and to load 404. So in a freewheeling step down converter, even diode recovery current supplies energy to the load, thereby improving converter efficiency.

Reduced Gate Drive Losses

Figure 10A:
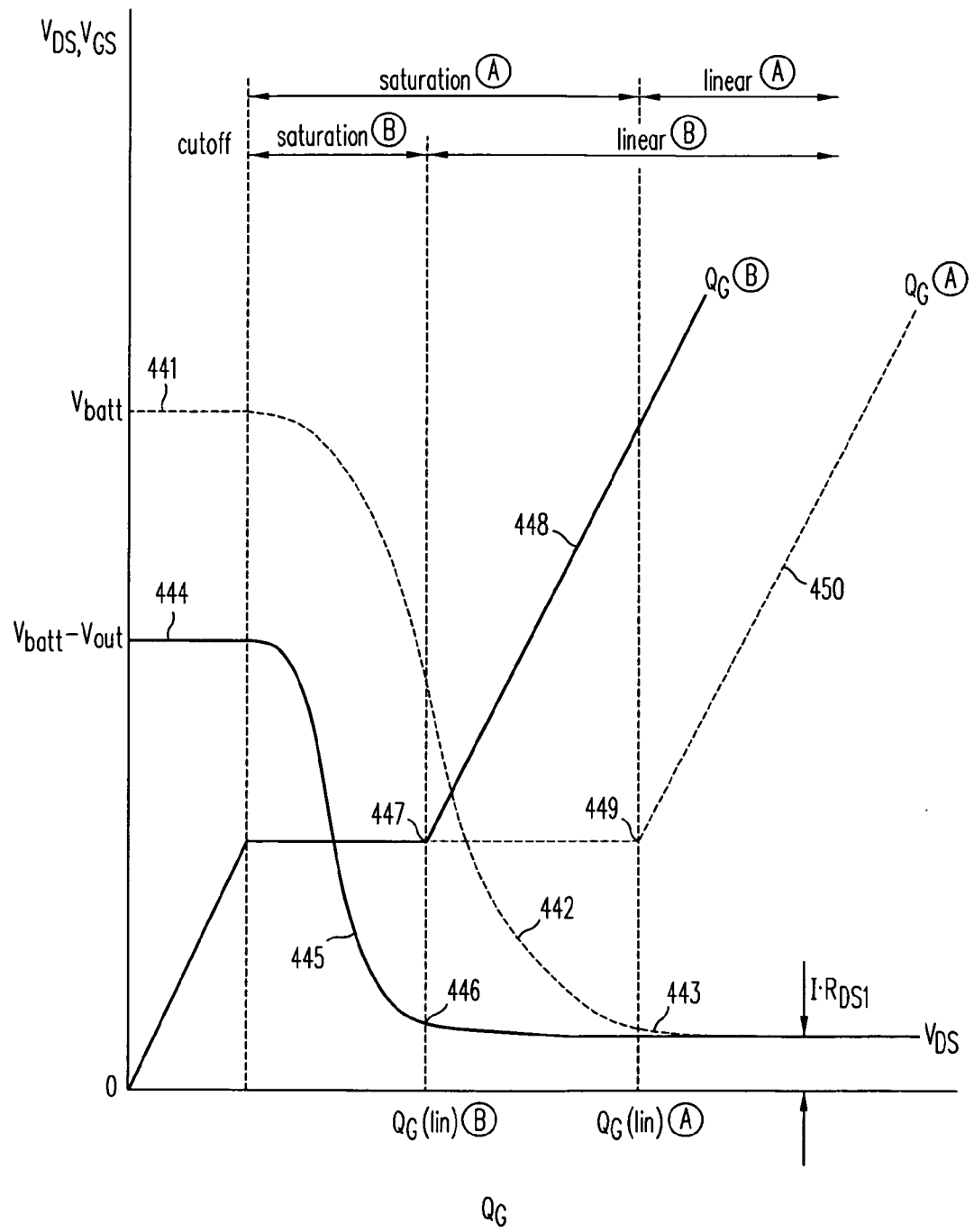
FIG. 10A is a graph showing a comparison between gate and drain voltages as a function of gate charge in a conventional Buck and freewheeling step-down converter.

Other benefits of the freewheeling step-down converter are its reduced gate charge and gate drive losses. Because $V_x$ varies only between a maximum value of $(+V_{batt}-I_L \cdot R_{DS1})$ and a minimum of $(+V_{out}-V_f)$, the drain-to-source voltage swing $\Delta V_{DS1}$ across the high-side MOSFET251 is approximately $(V_{batt}-V_{out})$. The benefit of this lower voltage swing is a reduction in the Miller effect and lower gate charge losses. This benefit is illustrated in FIG. 10A where graph 440 includes two gate charge curves—a curve $Q_G(B)$ for a freewheeling step-down-converter and a curve $Q_G(A)$ for a conventional Buck converter.

As shown, the gate charge-curve $Q_G(A)$ for a Buck converter comprises a cutoff region, a $\Delta Q_{GD}$ plateau region ending at point 449, and beyond the plateau region a linear region 450, with a corresponding drain-to-source voltage curve having regions 441, 442 and 443. In the cutoff region 441 of the drain-to-source voltage curve, $V_{DS}$ is equal to $V_{batt}$. In the linear region 443 of the drain-to-source voltage curve, $V_{DS}$ is equal to $I_L \cdot R_{DS1}$.

In contrast, the gate charge-curve $Q_G(B)$ for a freewheeling step-down-converter comprises cutoff region, $\Delta Q_{GD}$ plateau region ending at point 447, and beyond the plateau region linear region 448, with a corresponding drain-to-source voltage curve having regions 444, 445 and 446. In the cutoff region 444 of the drain-to-source voltage curve, $V_{DS}$ is equal to $(V_{batt}-V_{out})$, i.e., the difference between the input and output voltages. In the linear region 443 of the drain-to-source voltage curve, $V_{DS}$ is equal to $I_L \cdot R_{DS1}$, the same as a conventional Buck converter.

Figure 10B:
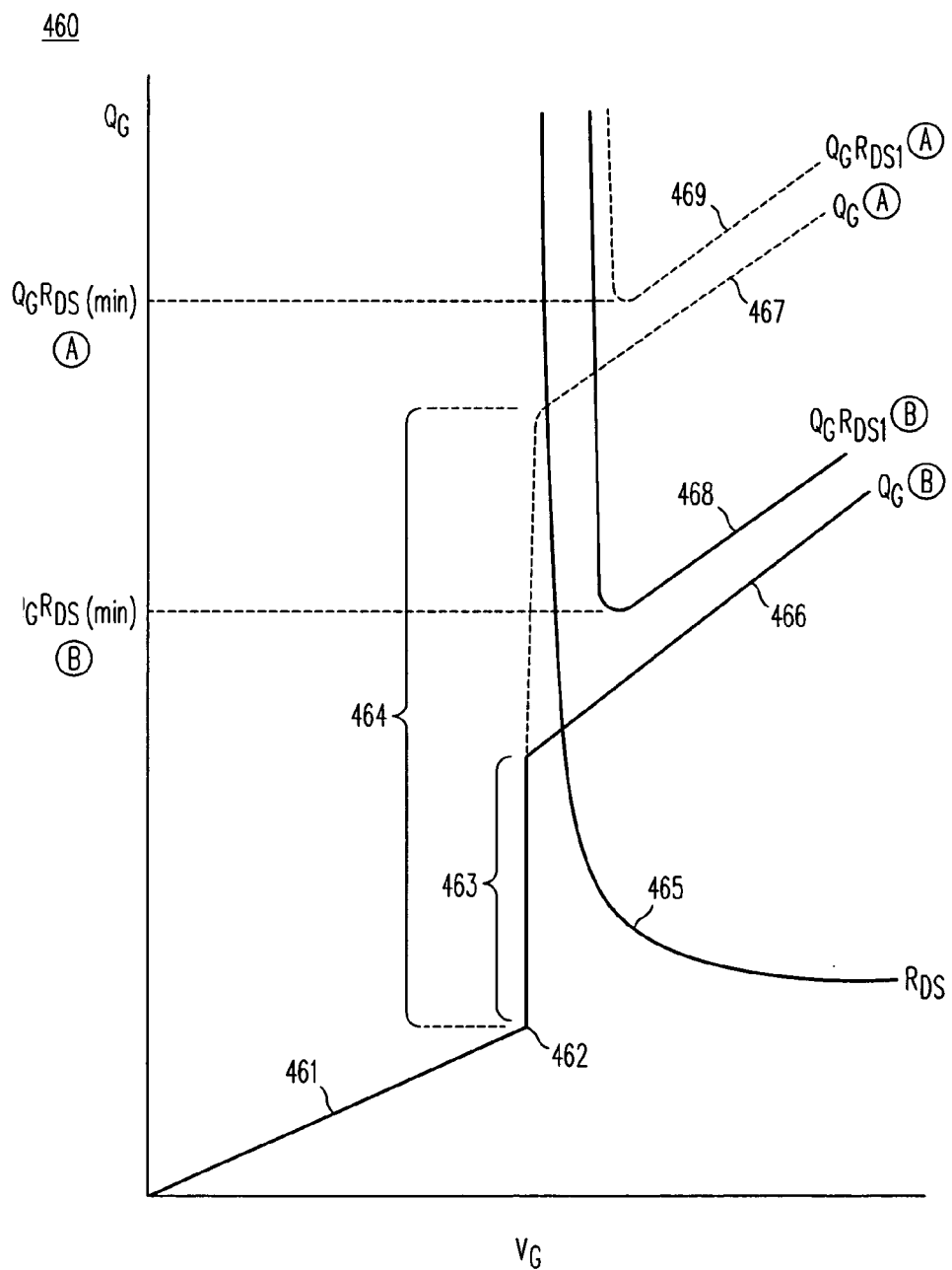
FIG. 10B is a graph of the on-resistance/gate-charge tradeoff in a conventional Buck and freewheeling step-down converter.

Since in a freewheeling step-down converter the drain voltage swings over a smaller range, the width of the $\Delta Q_{GD}$ plateau is reduced proportionately. This benefit is more clearly illustrated in FIG. 10B plotting the MOSFETs' gate charge (curves 466 and 467), on-resistance (curve 465), and the $Q_G \cdot R_{DS}$ multiplicative products (curves 468 and 469) on the y-axis against the gate bias $V_{GS}$ on the x-axis. As shown in graph 450, up to point 462 in the off region, the high-side MOSFET in both converters exhibits the same gate-charge 461. Beyond point 462, the feedback effect causes the Buck converter to exhibit additional charge $\Delta Q_{GD}$ of magnitude 464, compared to the freewheeling step-down converter's smaller Miller effect charge 463. For higher gate biases, both MOSFETs exhibit linearly increasing gate charge 466 and 467 with equivalent slopes.

To make a more accurate comparison, MOSFET linear-region gate charges 466 and 467 in the two application circuits can be normalized by resistance 465, resulting in figure-of-merit curves 468 and 469 for freewheeling and Buck topologies. The Buck converter's figure-of-merit curve 469 has a minimum value of $Q_G \cdot R_{DS1}$, significantly higher than the freewheeling step-down-converter's figure-of-merit curve 468. Depending on the MOSFET's construction and the converter's input and output voltages, the freewheeling step-down converter can easily reduce gate drive losses by as much as 80% compared to prior art Buck converters operating under similar conditions.

Eliminating Discontinuous and Reversing Inductor Current

Figure 11A:
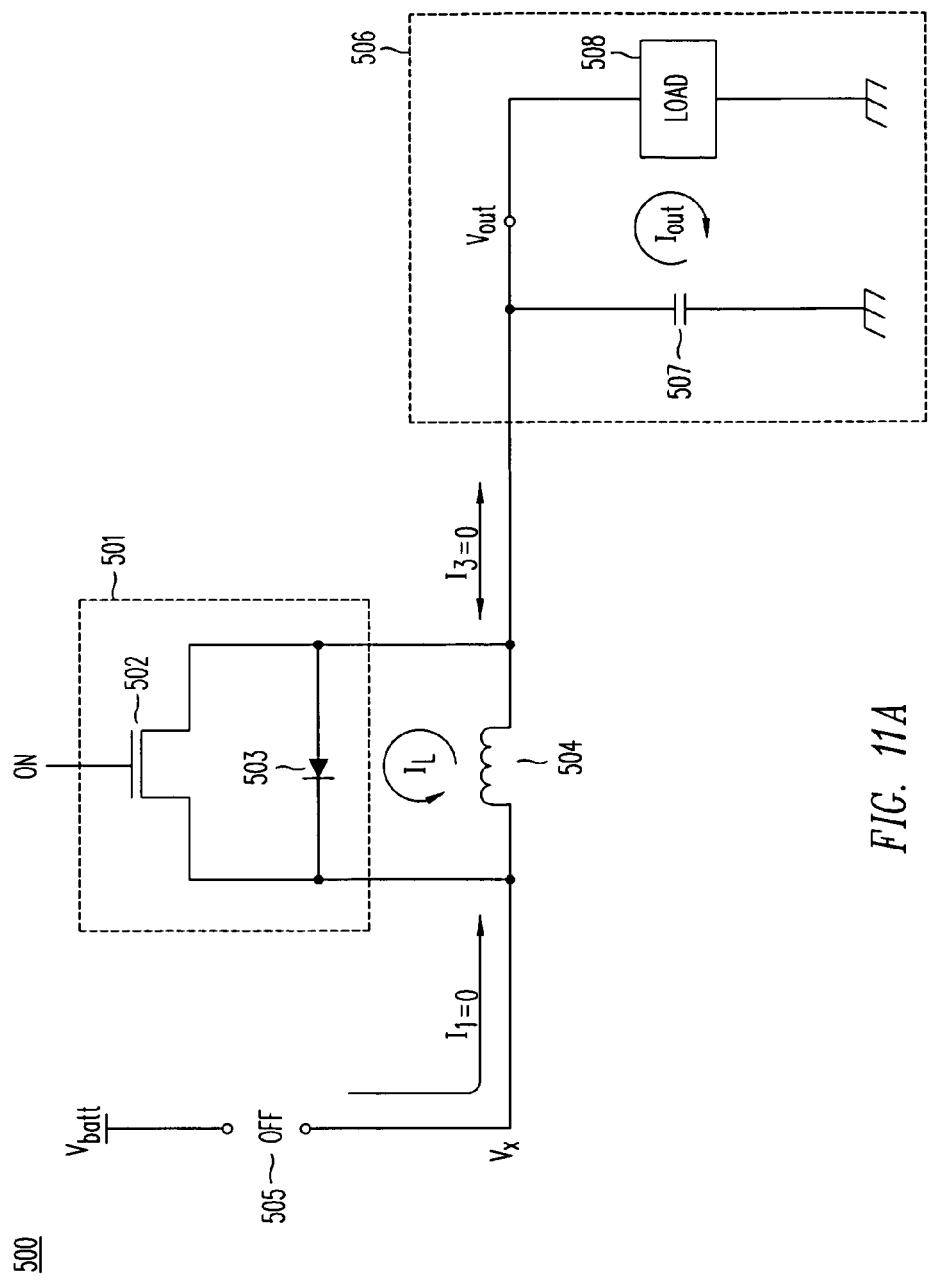
FIG. 11A is an equivalent circuit diagram of a freewheeling step-down converter under light load conditions.

The freewheeling step-down-converter also offers unique benefits during light-load operation, as illustrated in the equivalent circuit diagram 500 of FIG. 11A. As shown, during light load conditions, when load 508 is drawing to little current to maintain $V_{out}$ at a targeted value, the freewheeling step-down-converter can operate for extended durations in a condition whereby high-side MOSFET 505 remains off (and therefore shown as an open circuit) and inductor 504 continues to recirculate its current in freewheeling clamp 501 without affecting the polarity of the current in load 508 or in output capacitor 507.

During the time when MOSFET 505 is off and $I_x=0$, the load is cut off from the battery input and the current $I_L$ in inductor 504 conducts primarily conducts through on-state MOSFET 502, shunting forward-biased diode 503. Since $I_L=I_{fw}$, no inductor current flows into the output 506 comprising capacitor 507 and load 508, i.e. $I_1=0$. Since $I_1$ is zero, the load circuit 506 is in essence cut-off from the rest of converter 500, and output capacitor 507 supplies load 508 with the current $I_{out}$ as needed.

Figure 11B:
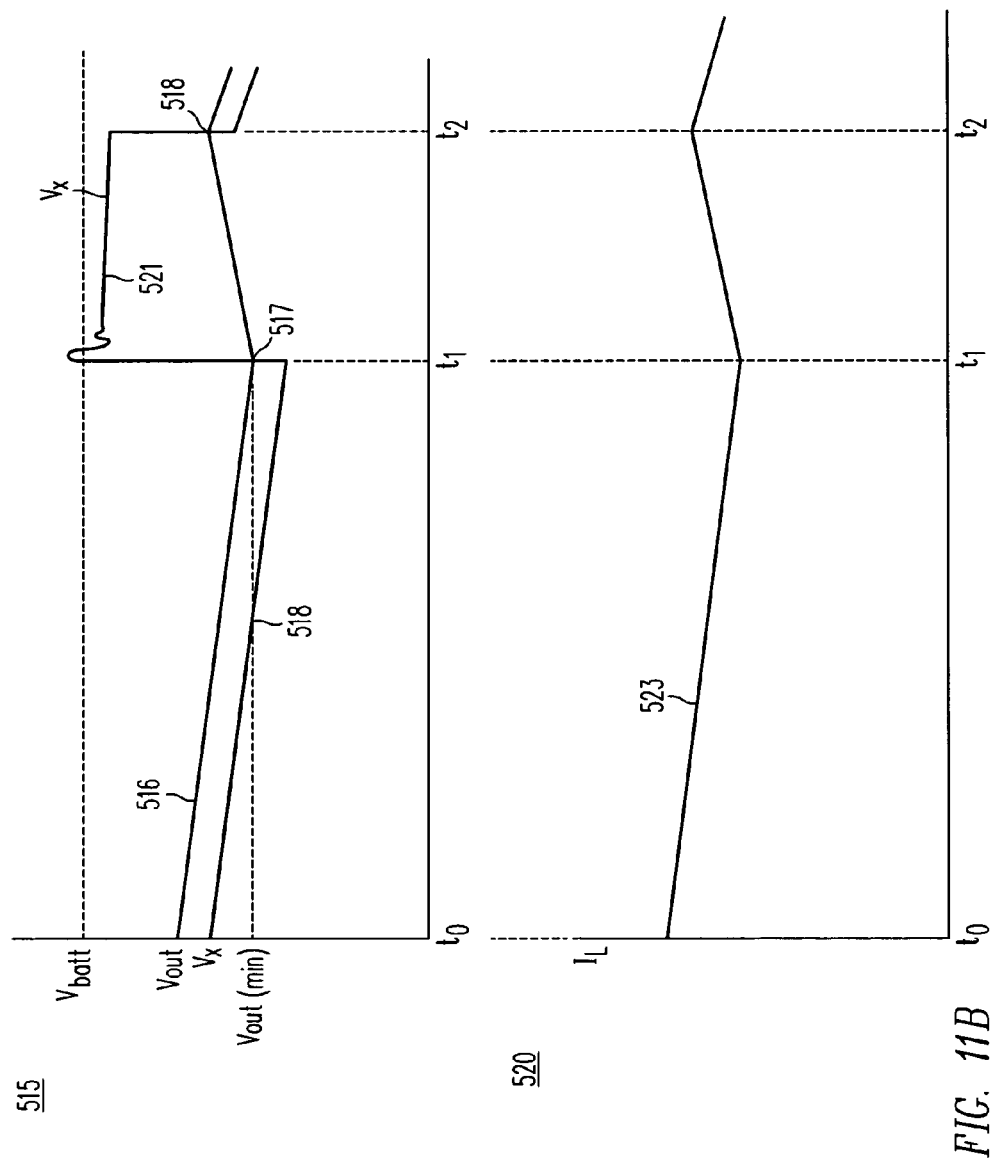
FIG. 11B is a graph illustrating voltage and current waveforms in a freewheeling step-down converter during light load operation

During extended periods of inductive current recirculation, no energy is being transferred from the inductor or battery to output circuit 506, and the output voltage $V_{out}$ will gradually decline as capacitor 507 discharges. This decline in the output voltage $V_{out}$ is illustrated by curve 516 in graph 515 of FIG. 11B. The voltage Vx shown by curve 518 tracks the output voltage since during freewheeling MOSFET conduction, $$V_x = V_{out} - I_L \cdot R_{DS2}$$

During this time, inductor and freewheeling MOSFET currents $I_{fw}=I_L$ decline only slightly in magnitude (curve 523 of graph 520). If the output voltage $V_{out}$ sags too low, this condition can be detected by a comparator or a variety of other means. As illustrated in graph 515, when $V_{out}$ reaches a limit $V_{out(min)}$ at point 517, control circuitry detects that the output voltage is going out of specified regulation.

Once this condition is detected, freewheeling MOSFET 502 is then turned off and high-side MOSFET 505 is momentarily turned on, driving $V_x$ to a voltage represented by curve 521, refreshing capacitor 507 and bringing $V_{out}$ to a voltage (curve 518) at the high end of its specified voltage range $V_{out(max)}$.

During this interval, the inductor current is delivered to load 508 and to the output capacitor 507, whereby $I_3=I_L$, and therefore $I_{fw}=0$. Once $V_{out}$ reaches the condition represented by curve 518, high-side MOSFET 505 is turned off, freewheeling MOSFET 502 is turned on, and the converter returns to its freewheeling state shown in equivalent circuit diagram 500, with a freewheeling current $I_{fw}$ equal to the inductor current $I_L$.

Since no substantial inductance is present in output circuit 506, for a resistive load 508, the current $I_{out}$ and the output voltage $V_c=V_{out}$ decay exponentially with a time constant of $\tau_{out}=RC$ without any means by which to reverse polarity. Similarly, with only junction capacitance present, freewheeling shunt and voltage clamp 501 conducts inductor current $I_L$ continuously, which decays exponentially with a time constant of $\tau_{FW}$=L/R. Without significant capacitance present in this isolated freewheeling circuit, no means exist by which the inductor current $I_L$ can reverse polarity.

Even if there is sufficient parasitic and junction capacitance to form an LC-tank and cause oscillations, and even if the inductor current does eventually reverse direction, it has no impact on the converter's efficiency. In light load operation, just as in normal operation, whenever the inductor current is freewheeling, $I_1$=0 and $I_3$=0, so that the freewheeling circuit does not affect the current or voltage in high-side MOSFET 505 or in output circuit 506.

Alternatively, whenever $I_L$ approaches a condition of reversing its direction, the polarity can be detected and freewheeling MOSFET 502 can be shut off. But since $I_3$=0 in any event, the polarity of current $I_L$ has no effect on the output circuit 506 and is irrelevant to converter's light-load operation.

Theoretically, if $I_L$ flows in a reverse direction, it can cause a current spike when MOSFET 505 turns back on. One means to prevent this current spike is to wait until $I_L$ oscillates back in its normal direction, i.e. from the $V_x$ node to the $V_{out}$ node, before again turning on MOSFET 505. Even if $I_L$ flows in reverse direction, however, its magnitude will be small and the resulting current spike will be negligible.

Freewheeling Step-Down-Converter MOSFET Gate-Drive Considerations

As a practical matter, the high-side and freewheeling MOSFETs in a freewheeling step-down-converter can comprise any combination of N-channel and P-channel devices.

Figure 12A:
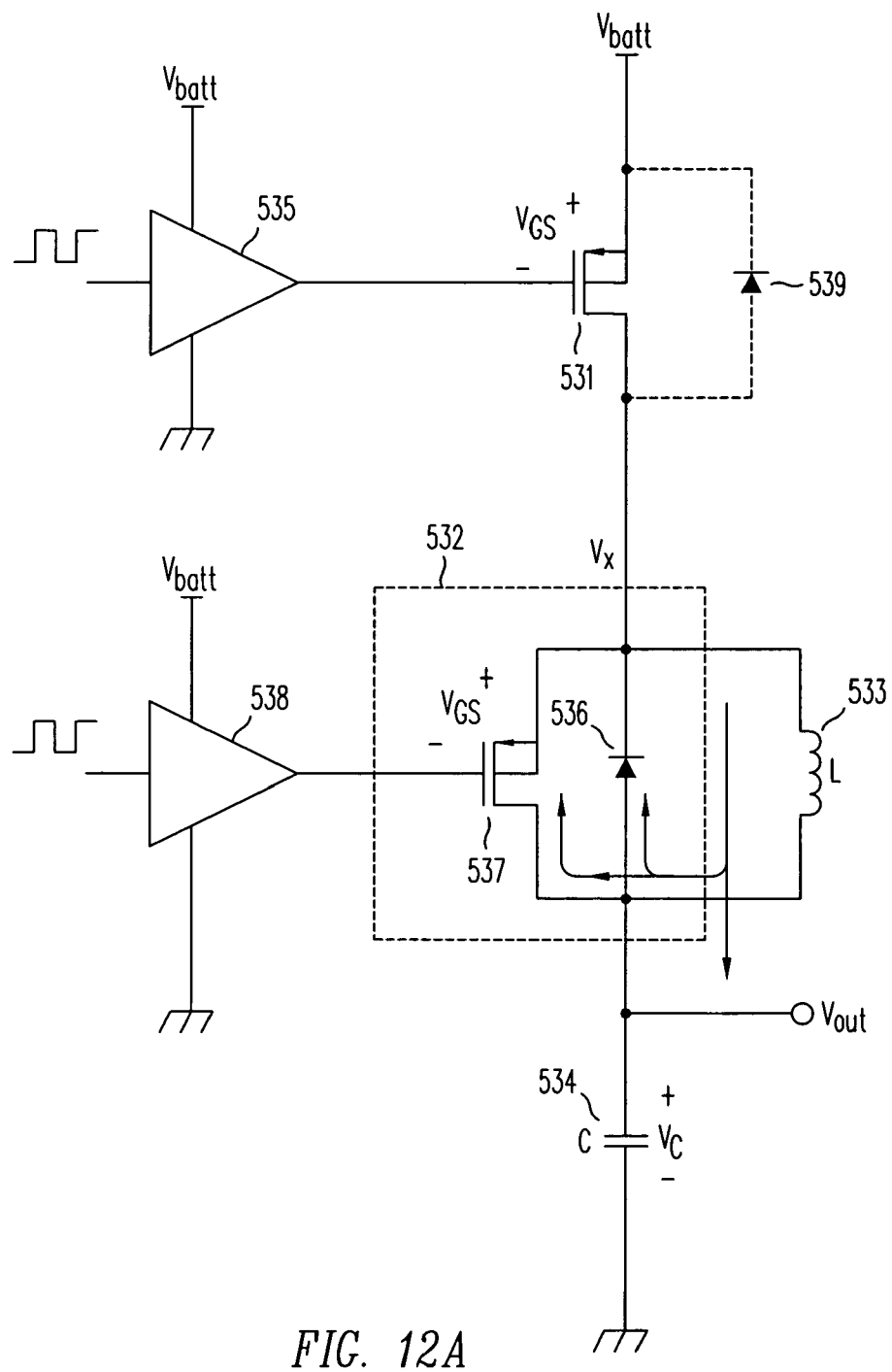
FIG. 12A is a circuit diagram of a freewheeling step-down converter having a P-channel high-side MOSFET and a P-channel freewheeling MOSFET.

In an all P-channel embodiment, shown in FIG. 12A, freewheeling step-down-converter 530 comprises a high-side P-channel MOSFET 531, a freewheeling P-channel MOSFET 532, an inductor 533 and an output capacitor 534. A freewheeling diode 536, parallel to freewheeling MOSFET 537 becomes forward-biased and conducting whenever high-side MOSFET 531 is off, and conversely remains reverse-biased and non-conducting whenever high-side MOSFET 531 is on.

As illustrated in schematic 530, high-side MOSFET 531 is driven by a CMOS gate buffer 535 powered by the input voltage $V_{batt}$. When the output of buffer 535 is at $V_{batt}$, then the gate-to-source voltage $V_{GS1}$ of MOSFET 531 is equal to zero and MOSFET 531 is off. When the output of buffer 535 is at ground, the gate bias $V_{GS2}$ of MOSFET 531 is equal to $-V_{batt}$ and MOSFET 531 is fully-on and conducting. The on-resistance of high-side MOSFET 531 does not depend on the value of $V_{out}$. Diode 539, in parallel with MOSFET 531 remains reverse-biased and non-conducting. (As used herein, $V_{GS1}$ designates the high gate voltage and $V_{GS2}$ designates the low gate voltage provided by a gate buffer to a given MOSFET, unless the context indicates otherwise.)

Also in circuit 530, freewheeling MOSFET 532 comprises a P-channel transistor 537 with an intrinsic P-N diode 536 connected in parallel with inductor 533. Powered by the converter's input voltage $V_{batt}$, gate drive buffer 538 drives MOSFET 537 with a rail-to-rail signal. When the output of buffer 538 is at $V_{batt}$, then the gate bias $V_{GS1}$ of MOSFET 537 is equal to $V_{batt}-V_{out}>0$, a positive gate bias. Since MOSFET 537 is a P-channel MOSFET, a positive gate bias turns it off. When the output of buffer 538 is at ground and $V_x \approx V_{out}$ then gate bias $V_{GS2}$ of MOSFET 537 is equal to $-V_{out}$ and MOSFET 537 is on and conducting.

The on-resistance of freewheeling P-channel MOSFET 537 depends on the voltage $V_{out}$. If $V_{out}$ is near $V_{batt}$ then with a grounded gate, the magnitude of $V_{GS}$ impressed on MOSFET 537 is large and its resistance is low. Conversely, if $V_{out}$ is near to ground, then since $V_{GS2}=-V_{out}$ MOSFET 537 is not fully enhanced and its on-resistance will be high. For very low output voltage converters, e.g. $V_{out}$=0.9V, the gate drive may be inadequate to turn on freewheeling MOSFET 537.

Figure 12B:
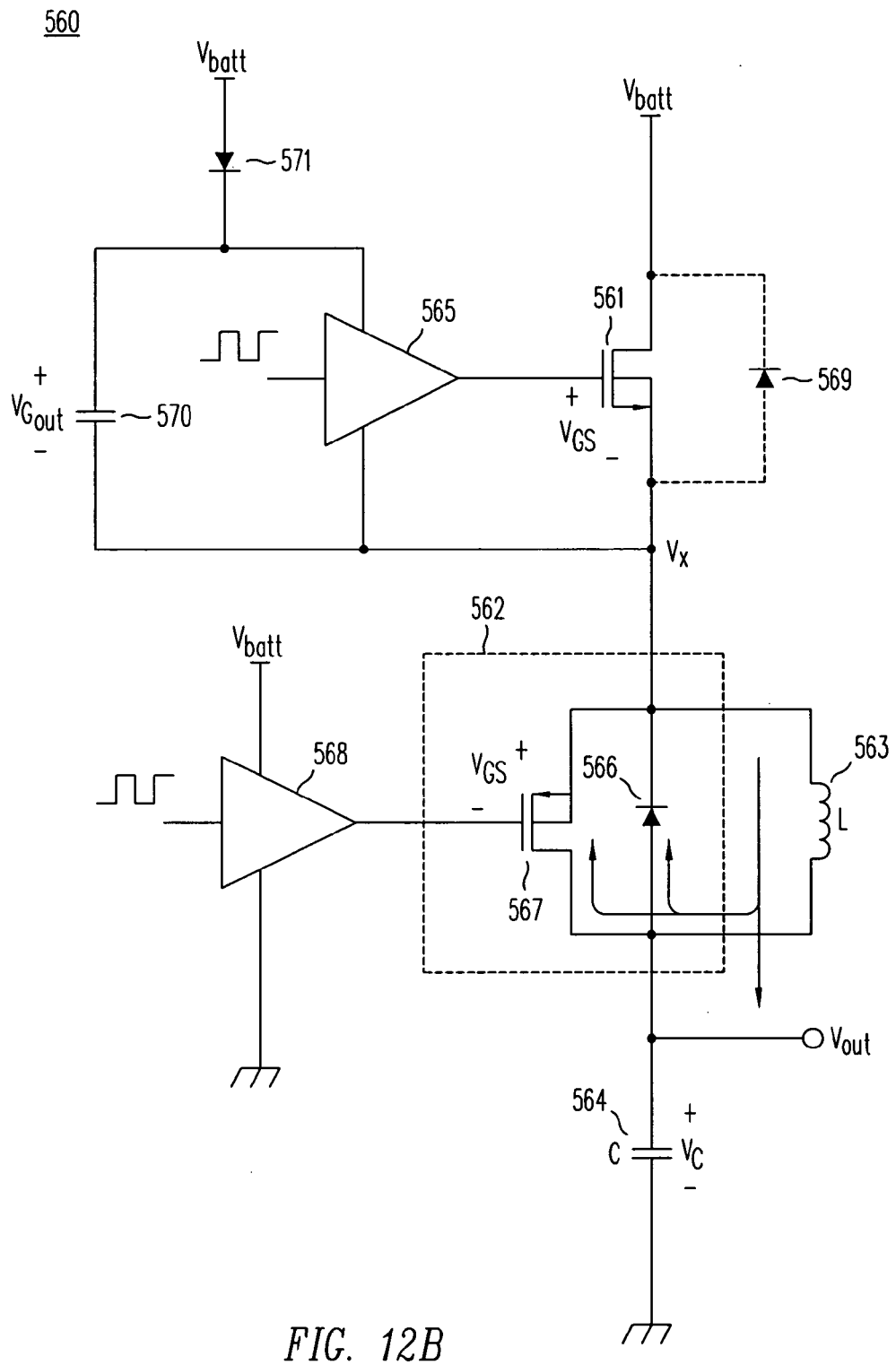
FIG. 12B is a circuit diagram of a freewheeling step-down converter having an N-channel high-side MOSFET follower and a P-channel freewheeling MOSFET.

In a complementary follower embodiment shown in FIG. 12B, a freewheeling step-down converter 560 comprises a high-side N-channel MOSFET 561, a freewheeling P-channel MOSFET 567, an inductor 563 and an output capacitor 564. A freewheeling diode 566, in parallel with freewheeling MOSFET 567, becomes forward-biased and conducting whenever high-side MOSFET 561 is off, and conversely remains reverse-biased and non-conducting whenever said high-side MOSFET is on.

As illustrated in schematic 560, high-side MOSFET 561 is driven by a bootstrap powered CMOS gate buffer 565 powered by bootstrap capacitor 570 charged to a voltage $V_{boot}$ whenever MOSFET 561 is off. During that time $V_x$ is approximately equal to $V_{out}$ and $V_{boot}$ charges to a voltage ($V_{batt}-V_{out}-V_f$), where $V_f$ is the forward voltage drop across a bootstrap diode 571. When the output of buffer 565 is high, its output is biased to a voltage of ($V_x+V_{boot}$) so that then $V_{GS1}=V_{boot}$ and MOSFET 561 is on. The on-resistance of high-side MOSFET 561 depends on the value of $V_{out}$. If $V_{out}$ is low, i.e. nearer ground, then $V_{boot}$ is large and MOSFET 561 is fully enhanced in its on state. Conversely if $V_{out}$ is high, nearer the battery potential then $V_{boot}$ may be inadequate to fully enhance N-channel MOSFET 561.

To turn off high-side N-channel 561, its gate must be biased to a potential equal to or more negative than $V_x$. As shown, when the output of buffer 565 is low then, because buffer 565 is referenced to the floating $V_x$ node, gate bias $V_{GS1}$=0 and N-channel MOSFET 561 is off and non-conducting. Diode 569, parallel to MOSFET 561 remains reverse-biased and non-conducting.

In converter 560 as in converter 530, freewheeling-MOSFET 562 comprises a P-channel transistor 567 with intrinsic P-N diode 566 parallel to inductor 563. Also powered by $V_{batt}$, gate-buffer 568 drives MOSFET 567 with a bias range equal to the full battery voltage range. When the output of buffer 568 is at $V_{batt}$ then $V_{GS1} \approx 0$, a zero gate bias turning off P-channel MOSFET 567. When the output of buffer 568 is ground and $V_x \approx V_{out}$ then gate bias $V_{GS2}=-V_{batt}$ and MOSFET 567 is on and conducting.

The on-resistance of P-channel 567 depends on the voltage $V_{out}$. If $V_{out}$ is near $V_{batt}$ then with a grounded gate, the magnitude of $V_{GS}$ impressed on MOSFET 567 is large and its resistance is low. Conversely, if $V_{out}$ is near ground, then since $V_{GS2}=-V_{out}$ the device is not fully enhanced and its on-resistance will be high. For very low output voltage converters, e.g. $V_{out}$=0.9V, the gate drive may be inadequate to turn-on freewheeling MOSFET 567.

Figure 12C:
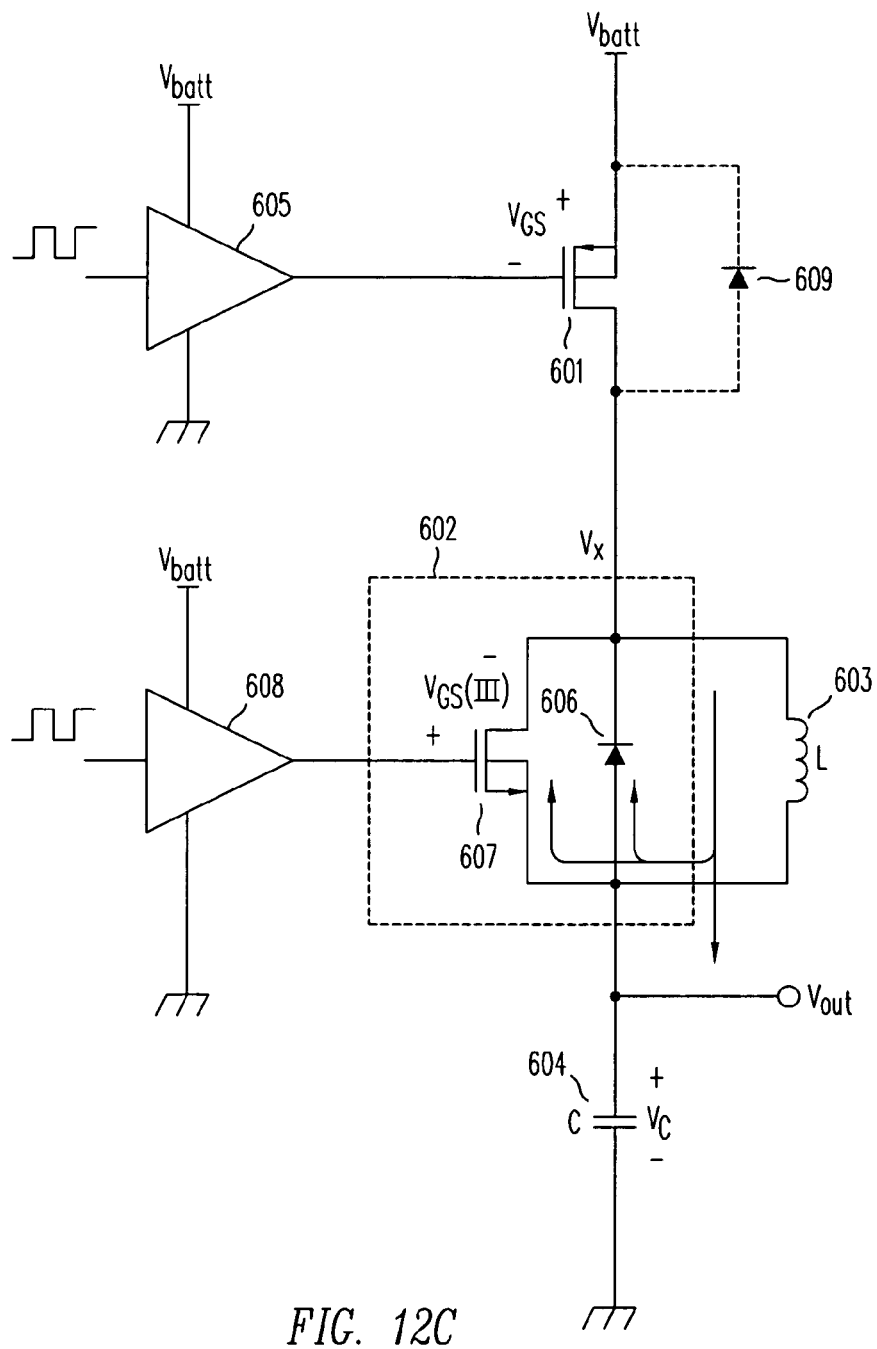
FIG. 12C is a circuit diagram of a freewheeling step-down converter having a P-channel high-side and an N-channel freewheeling MOSFET with a fixed rail drive.
Figure 12D:
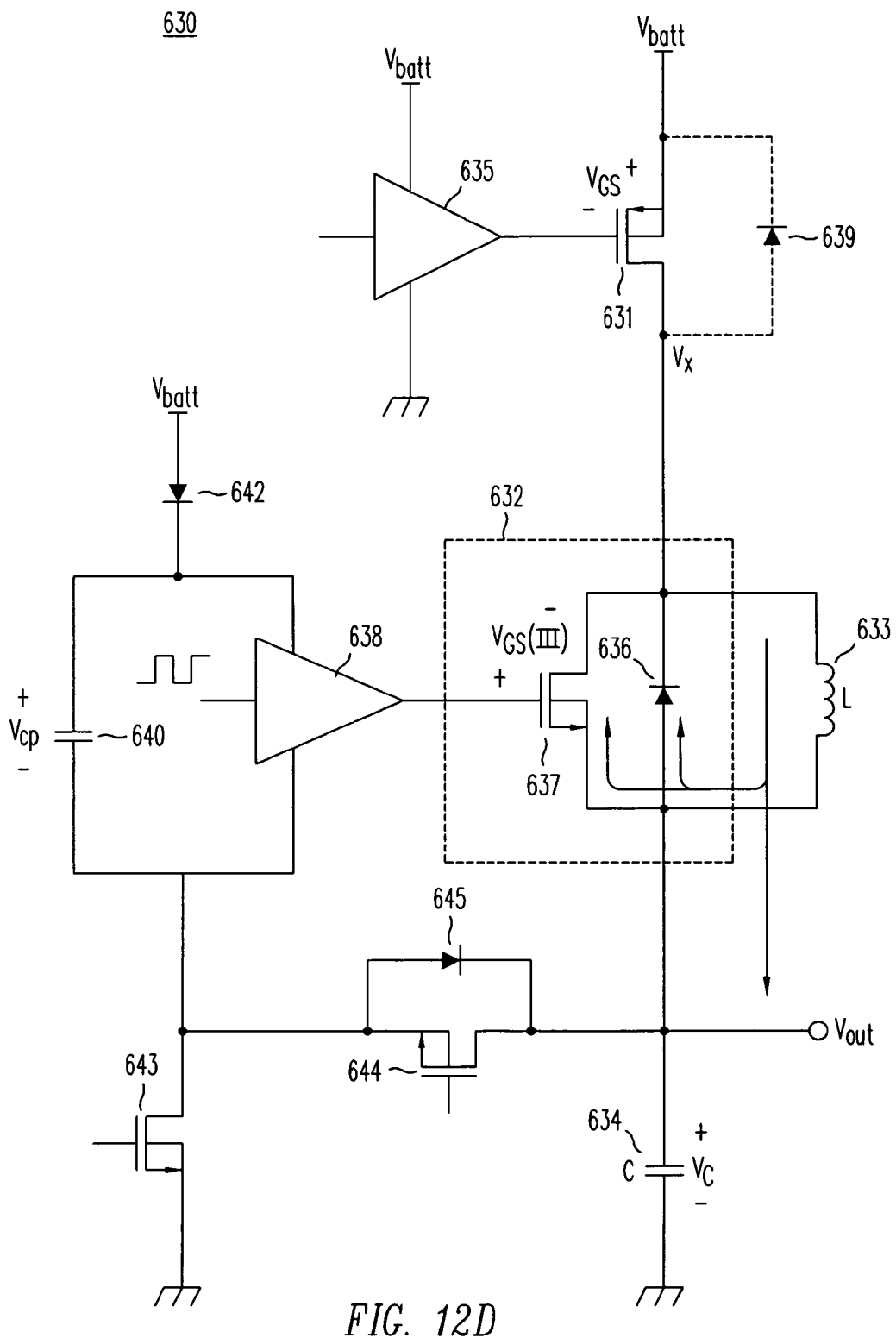
FIG. 12D is a circuit diagram of a freewheeling step-down converter having a P-channel high-side and an N-channel freewheeling MOSFET with a charge-pump floating drive.

The complementary MOSFET implementations of the freewheeling step-down converters 600 and 630 shown in FIGS. 12C and 12D employ P-channel high-side MOSFETs 601 and 631 driven rail-to-rail by gate buffers 605 and 635. The on-resistance of high-side MOSFETs 601 and 631 does not depend on the output voltage $V_{out}$.

The N-channel freewheeling MOSFETs 607 and 637 in converters 600 and 630 differ in their gate drives. In converter 600, shown in FIG. 12C, N-channel freewheeling MOSFET 607 is driven rail-to-rail by a $V_{batt}$-powered gate buffer 608. Grounding the gate of MOSFET 607 turns it off. When the output of buffer 608 is biased to $V_{batt}$, MOSFET 607 behaves like a follower and exhibits a low-resistance provided that $V_{out}$ is not too close to $V_{batt}$. If $V_{out}$ is too close to $V_{batt}$, the gate bias may be inadequate to provide a low on-resistance in MOSFET 607.

An improved embodiment of a gate drive for an N-channel freewheeling MOSFET is shown in FIG. 12D, where a gate buffer 638 is powered by a charge-pump capacitor 640 charged to nearly the full battery voltage $V_{batt}$ by turning on a low-side MOSFET 643 whenever high-side MOSFET 631 is on and conducting. During this time, a diode 642 forward biases and charges capacitor 640 to a voltage $V_{CP}=(V_{batt}-V_f)$ where $V_f$ is the forward voltage drop across diode 642. During this time MOSFET 644 is off and diode 645 is reverse biased.

To turn on freewheeling MOSFET 637, charge pump MOSFET 643 is turned off in unison with high side MOSFET 631. MOSFET 644 is turned on, referencing the negative terminal of charge pump capacitor 640 and gate buffer 638 to the output voltage $V_{out}$. Immediately, the positive terminal of capacitor 640 assumes a potential of $(V_{CP}+V_{out})$ so that the gate bias on freewheeling N-channel MOSFET 637 is then given by the relation $V_{GS}=V_{CP}\approx V_{batt}$. Since gate buffer 638 and N-channel freewheeling MOSFET 637 are referenced to $V_{out}$, the on-resistance of MOSFET 637 is independent of the value of $V_{out}$. The freewheeling N-channel MOSFET 637, like high-side P-channel MOSFET 631, therefore has a low on-resistance that does not depend on the value of $V_{out}$.

In this regard, converter 630 represents a preferred embodiment of the gate drive and power MOSFET topology comprising the step-down freewheeling converter and voltage regulator disclosed herein.

The following table summarizes the performance benefits of the freewheeling step-down switching regulator and compares them to the less advantageous prior art Buck and synchronous Buck converters.

| Parameter | Buck | Synchronous Buck | Freewheeling step-down |
|---|---|---|---|
| $V_{max} > \|V_x\| > V_{min}$ | $+V_{batt}$ to $-V_f$ | $+V_{batt}$ to $-V_f$ | $+V_{batt}$ to $+V_{out}$ |
| Negative $V_x$ | Yes | Yes | No |
| $\Delta V_{DS1}$ Swing | High, $V_{batt}$ | High, $V_{batt}$ | Low, $V_{batt} - V_{out}$ |
| Gate Charge $\Delta Q_{DG}$ | High | High | Low |
| Rectifier Losses | High, $I_L \cdot V_f$ | Low, $I_L^2 \cdot R_{DS2}$ | Low, $I_L^2 \cdot R_{DS2}$ |
| Recovery Voltage | High Diode Stress | High Diode Stress | Low Diode Stress |
| Recovery dV/dt | High Slew Rate | High Slew Rate | Reduced Slew Rate |
| Recovery Current | Shunts $V_{batt}$ | Shunts $V_{batt}$ | To Output |
| Light Load | Discontinuous | Current Reversal | Continuous |

While specific embodiments of this invention have been described, these embodiments are illustrative and not limiting. Many additional and alternative embodiments will be apparent to persons of skill in the art from the description herein.

I claim:

1. A DC/DC converter comprising:
   a high-side MOSFET, an inductor and an output capacitor connected in series between an input terminal and a supply voltage terminal;
   a freewheeling clamp comprising a freewheeling MOSFET connected in parallel with the inductor;
   break-before-make (BBM) circuitry connected to drive the gates of the high-side and freewheeling MOSFETs, respectively;
   a pulse-width modulation circuit connected to drive the BBM circuitry; and
   an output terminal coupled to a node between the inductor and the output capacitor;
   wherein the BBM circuitry comprises a first BBM buffer having an output terminal connected to drive the gate of the freewheeling MOSFET, a first supply terminal of the first BBM buffer being connected through a second diode to the input terminal, a second supply terminal of the first BBM buffer being connected through a third MOSFET to the supply voltage terminal and through a fourth MOSFET to a common node between the inductor and the output capacitor, to a bootstrap capacitor being connected between the first and second supply terminals of the first BBM buffer.

2. The DC/DC converter of claim 1 wherein the freewheeling MOSFET comprises an N-channel MOSFET.

3. The DC/DC converter of claim 1 wherein the BBM circuitry comprises a second BBM buffer having an output terminal connected to drive the gate of the high-side MOSFET, a first supply terminal of the first BBM buffer being connected to the input terminal, a second supply terminal of the first BBM buffer being to the supply voltage terminal.

4. The DC/DC converter of claim 3 wherein the high-side MOSFET comprises a P-channel MOSFET.

5. A method of converting, a first DC voltage to a second DC voltage comprising:
   providing, a circuit comprising a first switch connected in series between an input terminal of the converter and a first terminal of an inductor and a second switch coupled between the first terminal and a second terminal of the inductor;
   connecting the first DC voltage to the input terminal of the converter;
   the method further comprising:
   (a) closing the first switch so as to magnetize the inductor, the second switch being maintained open while the first switch is closed;
   (b) opening the first switch;
   (c) immediately after opening the first switch, allowing a first BBM interval to pass wherein the first and second switches are open;
   (d) immediately after allowing the first BBM interval to pass, closing the second switch so as short the first and second terminals of the inductor together and to allow a freewheeling current to flow through the second switch and the inductor, the first switch being maintained open while the second switch is closed;
   (e) opening the second switch;
   (f) immediately after opening the second switch, allowing a second BBM interval to pass wherein the first and second switches are open;
   immediately after allowing the second BBM interval to pass, repeating (a) through (f);
   taking the second DC voltage at an output terminal of the converter, the output terminal being coupled to the second terminal of the inductor.

6. The method of claim 5 comprising, connecting a diode in parallel with the second switch.

* * * * *